(12) United States Patent
Liu

(10) Patent No.: US 12,432,550 B2
(45) Date of Patent: *Sep. 30, 2025

(54) SYSTEMS AND METHOD FOR SECURE UPDATES OF CONFIGURATION PARAMETERS PROVISIONED IN USER EQUIPMENT

(71) Applicant: NOKIA TECHNOLOGIES OY, Espoo (FI)

(72) Inventor: Jennifer Liu, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,895

(22) Filed: Jan. 10, 2024

(65) Prior Publication Data
US 2024/0147227 A1  May 2, 2024

Related U.S. Application Data

(63) Continuation of application No. 17/252,721, filed as application No. PCT/US2019/054883 on Oct. 4, 2019, now Pat. No. 11,937,077.

(Continued)

(51) Int. Cl.
*H04L 29/00* (2006.01)
*H04W 8/18* (2009.01)
(Continued)

(52) U.S. Cl.
CPC ......... *H04W 12/037* (2021.01); *H04W 8/183* (2013.01); *H04W 8/245* (2013.01); *H04W 12/106* (2021.01); *H04W 12/40* (2021.01)

(58) Field of Classification Search
CPC . H04W 12/037; H04W 12/106; H04W 12/40; H04W 8/183; H04W 8/245
(Continued)

(56) References Cited

U.S. PATENT DOCUMENTS

2002/0044552 A1   4/2002  Vialen et al.
2008/0076392 A1*  3/2008  Khetawat .......... H04W 12/0431
                                            455/411
(Continued)

FOREIGN PATENT DOCUMENTS

CN     108616907 A   10/2018
KR    20120099567 A    9/2012
(Continued)

OTHER PUBLICATIONS

"3rd Generation Partnership Project; Technical Specification Group Core Network and Terminals; Non-Access-Stratum (NAS) functions related to Mobile Station (MS) in idle mode (Release 15)", 3GPP TS 23.122 v15.5.0, (Sep. 2018), 62 pages.
(Continued)

*Primary Examiner* — Brandon Hoffman
*Assistant Examiner* — Michael D Anderson
(74) *Attorney, Agent, or Firm* — ALSTON & BIRD LLP

(57) ABSTRACT

Systems and methods that update configuration parameters on a UE using control plane functionalities. In one embodiment, an AMF element of a mobile network receives a control plane message from a UDM element that includes a UE configuration parameter update for the UE. The UE configuration parameter update is security protected via a secured packet, integrity protection, etc. The AMF element is configured to transparently send the UE configuration parameter update to the UE. Thus, AMF element inserts the UE configuration parameter update (that is security protected) in a container of a Non-Access Stratum (NAS) message, and sends the NAS message to the UE. The UE may then update its configuration parameters based on the update when security checks are complete.

37 Claims, 14 Drawing Sheets

Related U.S. Application Data

(60) Provisional application No. 62/742,341, filed on Oct. 6, 2018.

(51) Int. Cl.
*H04W 8/24* (2009.01)
*H04W 12/037* (2021.01)
*H04W 12/106* (2021.01)
*H04W 12/40* (2021.01)

(58) Field of Classification Search
USPC .......................................................... 726/3
See application file for complete search history.

(56) References Cited

U.S. PATENT DOCUMENTS

| | | | |
|---|---|---|---|
| 2011/0246777 | A1 | 10/2011 | Buckley et al. |
| 2016/0338038 | A1 | 11/2016 | Zhang et al. |
| 2018/0220364 | A1 | 8/2018 | Li et al. |
| 2018/0288582 | A1* | 10/2018 | Buckley ............... H04W 12/06 |
| 2019/0373441 | A1 | 12/2019 | Ryu et al. |
| 2019/0394698 | A1 | 12/2019 | Jeong |
| 2020/0329450 | A1 | 10/2020 | Youn et al. |

FOREIGN PATENT DOCUMENTS

| | | |
|---|---|---|
| KR | 101859564 B1 | 5/2018 |
| KR | 1020180057665 A | 5/2018 |
| RU | 2656339 C2 | 6/2018 |
| WO | WO 2018/097599 A1 | 5/2018 |
| WO | WO 2018/097601 A1 | 5/2018 |
| WO | WO 2018/131984 A1 | 7/2018 |

OTHER PUBLICATIONS

"3rd Generation Partnership Project; Technical Specification Group Core Network and Terminals; Non-Access-Stratum (NAS) protocol for 5G System (5GS); Stage 3; (Release 17)", 3GPP TS 24.501 v17.1.0, (Dec. 2020), 746 pages.
"3rd Generation Partnership Project; Technical Specification Group Services and System Aspects; Security architecture and procedures for 5G system (Release 16)", 3GPP TS 33.501 v16.4.0, (Sep. 2020), 250 pages.
"3rd Generation Partnership Project; Technical Specification Group Services and System Aspects; Security architecture and procedures for 5G system (Release 17)", 3GPP TS 33.501 v17.0.0, (Dec. 2020), 253 pages.
"3rd Generation Partnership Project; Technical Specification Group Services and System Aspects; Vocabulary for 3GPP Specifications (Release 17)", 3GPP TR 21.905 v17.0.0, (Jul. 2020), 65 pages.
3rd Generation Partnership Project; Technical Specification Group Core Network and Terminals; Non-Access-Stratum (NAS) protocol for Evolved Packet System (EPS); Stage 3 (Release 15), 3GPP TS 24.301 V15.4.0, Sep. 2018, pp. 1-530.
3rd Generation Partnership Project; Technical Specification Group Core Network and Terminals; Secured packet structure for (Universal) Subscriber Identity Module (U)SIM Toolkit applications (Release 14), 3GPP TS 31.115, V14.0.0, Mar. 2017, pp. 1-18.
3rd Generation Partnership Project; Technical Specification Group Services and System Aspects; System Architecture for the 5G System; Stage 2 (Release 15), 3GPP TS 23.501, V15.3.0, Sep. 2018, pp. 1-226.
5G network selection—discussion on issue in solution for providing list of preferred PLMN/access technology aombinations after registration, 3GPP TSG-CT WG1 Meeting #109, C1-181126, Agenda Item:15.2.2.2, Ericsson, Feb. 26-Mar. 2, 2018, 2 pages.
Decision to Grant for Japanese Application No. 2021-518763 dated Dec. 4, 2023, 5 pages.
Decision to Grant for Russian Application No. 2021112741/7 dated Sep. 8, 2022, 26 pages.
Discussion on Routing ID Update Solutions, 3GPP TSG-CT WG1 Meeting #112bis, C1-186089, Nokia, Oct. 15-19, 2018, 21 pages.
Discussion on Routing indicator update call flow and security protection, 3GPP TSG-CT WG1 Meeting #112bis, 31-186201, Agenda Item: 15.2.2.2, Nokia, Oct. 15-19, 2018, 5 pages.
Dynamic Routing Indicator Update Description, 3GPP TSG-CT WG1 Meeting #112bis, C1-186091, Nokia, Oct. 15-19, 2018, 6 pages.
Dynamic Routing Indicator Update Description, 3GPP TSG-CT WG1 Meeting #113, C1-188943, Nokia, Nov. 26-30, 2018, 6 pages.
Evaluation of Solutions for Routing ID Update, 3GPP TSG CT WG1 Meeting #112bis, C1-186239, Agenda item: 15.2.2.3, Qualcomm Incorporated, Oct. 15-19, 2018, 5 pages.
EventHelix, "5G Service-Based Architecture (SBA)", Retrieved via the Internet on Nov. 30, 2022, <URL:https://medium.com/5g-nr/5g-service-based-architecture-sba-47900b0ded0a>, (Oct. 20, 2018), 17 pages.
Examination Report for Australian Application No. 2019355197 dated Mar. 3, 2022, 3 pages.
First Examination Report for Indian Application No. 202127020037 dated Aug. 23, 2022, 7 pages.
Hearing Notice for Indian Application No. 202127020037 dated Dec. 15, 2023, 2 pages.
Huawei et al., "Delay the Transmission of Kseaf After Home Network Verifies the Res*", 3GPP TSG-SA WG3 Meeting #92, Change Request 0280, S3-182285, (Aug. 20-24, 2018), 6 pages.
Intel, "Interim Conclusion for Key Issue #6", SA WG2 Meeting #128, S2-187217, (Jul. 2-6, 2018), 6 pages.
Intel, "SoR Living Doc: Secure Packet Solution for Steering of Roaming", 3GPP TSG SA WG3 (Security) Meeting #91-Bis, S3-181703, (May 21-25, 2018), 3 pages.
Interim Conclusion For Key Issue #6, SA WG2 Meeting #128, S2-187214, Agenda Item: 6.9, Intel, Jul. 2-6, 2018, pp. 1-6.
International Search Report and Written Opinion received for corresponding Patent Cooperation Treaty Application No. PCT/US2019/054883, dated Dec. 4, 2019, 15 pages.
LG Electronics et al., "TS 23.502 P-CR New Procedure on NW Initiated UE Configuration Update", Sa WG2 Meeting #120, S2-171854, (Mar. 27-31, 2017), 4 pages.
LS on Routing ID, 3GPP TSG SA WG2 #128bis, S2-188870, SA2, Aug. 20-24, 2018, 1 page.
New solution: Protected UE configuration update commands, 3GPP TSG SA WG3 (Security) Meeting #90, 33-180374, Agenda Item: 7.2.16 (Security for PLMN/RAT selection policies for roaming), Ericsson, Jan. 22-26, 2018, 3 pages.
Notice of Acceptance for Australian Application No. 2019355197 dated Mar. 7, 2023, 3 pages.
Notice of Acceptance for Chilean Application No. 2021-000848 dated Aug. 16, 2023, 2 pages.
Notice of Allowance for Korean Application No. 10-2021-7013619 dated Jun. 22, 2022, 3 pages.
Notice of Allowance for Korean Application No. 10-2022-7033020 dated May 11, 2023, 5 pages.
Notice of Allowance for Saudi Arabia Application No. 521421655 dated Dec. 30, 2023, 3 pages.
Notice of Eligibility for Singapore Application No. 11202103439T dated Jan. 17, 2024, 4 pages.
Office Action and Search Report for Russian Application No. 2021112741/07 dated Sep. 22, 2021, 8 pages.
Office Action for Algerian Application No. DZ/P/2021/000219 dated Mar. 17, 2022, 2 pages.
Office Action for ARIPO Application No. AP/P/2021/013089 dated Nov. 8, 2022, 5 pages.
Office Action for Chilean Application No. 202100848 dated Jul. 11, 2022, 28 pages.
Office Action for Chinese Application No. 201980070436.9 dated Apr. 28, 2023, 12 pages.
Office Action for Chinese Application No. 201980070436.9 dated Oct. 9, 2022, 25 pages.
Office Action for Chinese Application No. 201980070436.9 dated Sep. 1, 2023, 16 pages.
Office Action for Egyptian Application No. 524/2021 dated Mar. 30, 2023, 5 pages.

(56) References Cited

OTHER PUBLICATIONS

Office Action for Japanese Application No. 2021-518763 dated Mar. 13, 2023, 11 pages.
Office Action for Japanese Application No. 2021-518763 dated May 25, 2022, 6 pages.
Office Action for Korean Application No. 10-2021-7013619 dated Nov. 29, 2021, 11 pages.
Office Action for Russian Application No. 2021112741/7 (027175) dated Apr. 14, 2022, 11 pages.
Office Action for Saudi Arabia Application No. 521421655 dated Jun. 14, 2023, 11 pages.
Office Action for Singapore Application No. 11202103439T dated Nov. 2, 2022, 13 pages.
Office Action for Thailand Application No. 2101002019 dated Jul. 25, 2023, 8 pages.
Office Action for Vietnamese Application No. 1-2021-02483 dated Oct. 18, 2021, 2 pages.
Pathak, R., "A Beginners Guide for 5G Core Network Architecture", Retrieved via the Internet on Nov. 30, 2022, <URL:https://www.rajarshipathak.com/2020/01/beginners-guide-for-5g-core-network-architecture.html>, (Jan. 2020), 9 pages.
Pauliac, M., "USIM in 5G Era", Retrieved via the Internet on Nov. 30, 2022, <URL:https://journals.riverpublishers.com/index.php/JICTS/article/view/1261/595>, (Jan. 4, 2020), 12 pages.
Procedure for Routing ID Update, 3GPP TSG-CT WG1 Meeting #112bis, C1-186240, Qualcomm Incorporated, Oct. 15-19, 2018, 14 pages.
Procedure for UDM-Triggered UE Parameters Update, 3GPP TSG-CT WG1 Meeting #113, C1-188946, Qualcomm Incorporated, Nov. 26-30, 2018, 17 pages.
Providing Routing ID Update During UE Registration, 3GPP TSG-CT WG1 Meeting #112bis, C1-186092, Nokia, Oct. 15-19, 2018, 17 pages.
Providing Routing ID Update During UE Registration, 3GPP TSG-CT WG1 Meeting #113, C1-188033, Nokia, Nov. 26-30, 2018, 17 pages.
Providing Routing ID Update via DL NAS Transport Procedure, 3GPP TSG- CT WG1 Meeting #112bis, C1-186093, Nokia, Oct. 15-19, 2018, 13 pages.
Reply LS on Routing ID, 3GPP TSG CT Meeting #81, CP-182238, TSG CT, Sep. 10-11, 2018, 1 page.
Reply LS on Routing ID, 3GPP TSG SA WG3 (Security) Meeting #92 ad-hoc, S3-183074, SA3, Sep. 24-28, 2018, 3 pages.
SA3, "Reply LS on Routing ID", 3GPP TSG CT WG1 Meeting #112bis, C1-186338, (Oct. 15-19, 2018), 3 pages.
Notice of Allowance for Korean Application No. 10-2023-7027414 dated Apr. 23, 2024, 5 pages.
Notice of Acceptance for Australian Application No. 2023201180 dated Jun. 4, 2024, 3 pages.
Examination Report for Australian Application No. 2023201180 dated Oct. 27, 2023, 3 pages.
Decision to Grant for ARIPO Application No. AP/P/2021/013089 dated Feb. 7, 2024, 5 pages.
U.S. Appl. No. 17/252,721, filed Dec. 15, 2020, U.S. Pat. No. 11,937,077, Patented.

* cited by examiner

US 12,432,550 B2

SYSTEMS AND METHOD FOR SECURE UPDATES OF CONFIGURATION PARAMETERS PROVISIONED IN USER EQUIPMENT

CROSS-REFERENCE TO RELATED APPLICATIONS

This application is a continuation of U.S. Non-Provisional patent application Ser. No. 17/252,721, filed Oct. 14, 2019 and entitled "Systems and Method for Secure Updates of Configuration Parameters Provisioned in User Equipment," which is a National Phase Entry under 35 U.S.C. § 371 of International Patent Application No. PCT/US2019/054883 filed on Oct. 4, 2019 and entitled "Systems and Method for Secure Updates of Configuration Parameters Provisioned in User Equipment," which claims the benefit of priority to U.S. Provisional Patent Application Ser. No. 62/742,341, filed on Oct. 6, 2018, the entire disclosures of each of which are hereby incorporated herein by reference in their entireties for all purposes as if fully provided herein.

TECHNICAL FIELD

This disclosure is related to the field of communication systems and, in particular, to updating mobile devices.

BACKGROUND

Service providers or carriers implement mobile networks to offer numerous voice and data services to end users of mobile phones or other mobile devices/terminals, which are referred to generally as User Equipment (UE). Some examples of voice services are voice calls, call forwarding, call waiting, etc. Some examples of data services are Internet access, streaming audio, streaming video, online gaming, Internet Protocol television (IP-TV), etc. A mobile network is a type of network where the last link to the end user is wireless. A mobile network generally includes a core network, and one or more Radio Access Networks (RAN) that exchange signaling and data with UEs over a radio interface.

A UE is typically provisioned with the International Mobile Subscriber Identity (IMSI) of the subscriber, security authentication, ciphering information, and other configuration parameters. There may be instances where the UE's home network needs to update one or more of the configuration parameters in a UE. For example, the UE's home network may update the configuration parameters when a subscription change occurs, when there is a new service assignment, when mobile networks migrate from Long-Term Evolution (LTE) to next generation networks, etc. It is therefore beneficial to identify enhanced procedures for updating configuration parameters in a UE.

BRIEF SUMMARY

Embodiments described herein provide for updates to UE configuration parameters using Non-Access Stratum (NAS) messages. As an overview, mobile networks migrating to next generation networks may include a Unified Data Management (UDM) and an Access and Mobility Management Function (AMF). The UDM, which is in the home network of a UE, is configured to assemble a UE configuration parameter update for a UE with security protection (e.g., a secured packet, integrity protection, etc.). The UDM sends the UE configuration parameter update, with security protection, to the AMF. The AMF, in turn, is configured to transparently send the UE configuration parameter update to the UE using a NAS message. Again, the UE configuration parameter update is security protected in the NAS message. Upon receipt of the NAS message, the UE is configured to update its UE configuration parameters based on the update provided in the NAS message. One technical benefit of this procedure is that end-to-end security is provided for the UE configuration parameter update. Another technical benefit is that native control plane functionalities may be used to update UE configuration parameters. Thus, a dedicated network element does not need to be deployed to provide the updates for UEs.

One embodiment comprises an AMF element of a mobile network. The AMF element includes a processor(s), and memory including computer program code executable by the processor. The processor is configured to cause the AFM element to receive a control plane message from a UDM element including a UE configuration parameter update for a UE. The UE configuration parameter update is security protected according to a protection mechanism. The processor is further configured to cause the AFM element to insert the UE configuration parameter update that is security protected in a container of a first NAS message, where the container is designated for the UE configuration parameter update. The processor is further configured to cause the AFM element to send the first NAS message to the UE with the container including the UE configuration parameter update that is security protected.

In another embodiment, the UE configuration parameter update is encapsulated in a secured packet according to the protection mechanism.

In another embodiment, the UE configuration parameter update is integrity protected using a NAS security context of the UE according to the protection mechanism.

In another embodiment, the UE configuration parameter update is encapsulated in a secured packet, and the secured packet is integrity protected using a NAS security context of the UE according to the protection mechanism.

In another embodiment, the first NAS message comprises a NAS registration accept message sent to the UE during a NAS registration procedure. The processor is further configured to cause the AMF element to receive a second NAS message from the UE during the NAS registration procedure with a container including a UE acknowledgement that the UE configuration parameter update was received, and send another control plane message to the UDM element with the UE acknowledgement. The second NAS message received from the UE may comprise a NAS registration complete message or an Uplink NAS Transport message.

In another embodiment, the first NAS message comprises a Downlink NAS Transport message of a NAS transport procedure performed after a NAS registration procedure. The processor is further configured to cause the AMF element to receive a second NAS message from the UE with a container including a UE acknowledgement from the UE that the UE configuration parameter update was received, and send another control plane message to the UDM element with the UE acknowledgement. The second NAS message comprises an Uplink NAS Transport message.

Another embodiment comprises a method of performing an update procedure to update UE configuration parameters provisioned on a UE. The method comprises receiving a control plane message in an AMF element from a UDM element that includes a UE configuration parameter update for the UE. The UE configuration parameter update is security protected according to a protection mechanism. The method further comprises inserting, at the AMF element, the UE configuration parameter update that is security protected in a container of a first NAS message, where the container is designated for the UE configuration parameter update. The method further comprises sending the first NAS message from the AMF element to the UE with the container including the UE configuration parameter update that is security protected.

In another embodiment, the UE configuration parameter update is encapsulated in a secured packet according to the protection mechanism.

In another embodiment, the UE configuration parameter update is integrity protected using a NAS security context of the UE according to the protection mechanism.

In another embodiment, the UE configuration parameter update is encapsulated in a secured packet, and the secured packet is integrity protected using a NAS security context of the UE according to the protection mechanism.

In another embodiment, the first NAS message comprises a NAS registration accept message sent from the AMF element to the UE during a NAS registration procedure.

In another embodiment, the method further comprises receiving a second NAS message at the AMF element from the UE during the NAS registration procedure with a container including a UE acknowledgement that the UE configuration parameter update was received, and sending another control plane message from the AMF element to the UDM element with the UE acknowledgement. The second NAS message may comprise a NAS registration complete message or an Uplink NAS Transport message.

In another embodiment, the first NAS message comprises a Downlink NAS Transport message of a NAS transport procedure performed after a NAS registration procedure.

In another embodiment, the method further comprises receiving a second NAS message at the AMF element from the UE with a container including a UE acknowledgement from the UE that the UE configuration parameter update was received, and sending another control plane message from the AMF element to the UDM element with the UE acknowledgement. The second NAS message comprises an Uplink NAS Transport message.

In another embodiment, the method further comprises receiving the first NAS message at the UE from the AMF element having the container that includes the UE configuration parameter update for the UE that is security protected, performing a security check at the UE to verify the UE configuration parameter update, and updating one or more of the UE configuration parameters based on the UE configuration parameter update when the UE configuration parameter update is verified.

In another embodiment, when the first NAS message includes a re-registration indicator, the method further comprises initiating a NAS registration procedure at the UE to re-register using the updated UE configuration parameters.

Another embodiment comprises a UE that includes a Universal Integrated Circuit Card (UICC) that hosts a Universal Subscriber Identity Module (USIM), a processor, and a memory including computer program code executable by the processor. One or both of the UICC and the memory stores UE configuration parameters for the UE. The processor is configured to cause the UE to receive a first NAS message from an AMF element having a container that includes a UE configuration parameter update for the UE that is security protected according to a protection mechanism. The UICC and/or the processor is configured to cause the UE to perform a security check to verify the UE configuration parameter update, and update one or more of the UE configuration parameters based on the UE configuration parameter update when the UE configuration parameter update is verified.

In another embodiment, the UE configuration parameter update is encapsulated in a secured packet within the container of the first NAS message.

In another embodiment, the UE configuration parameter update is integrity protected using a NAS security context of the UE.

In another embodiment, the UE configuration parameter update is encapsulated in a secured packet within the container of the first NAS message, and the secured packet is integrity protected using a NAS security context of the UE.

In another embodiment, the first NAS message comprises a NAS registration accept message sent to the UE during a NAS registration procedure.

In another embodiment, when the NAS registration accept message includes a UE acknowledgement indicator, the processor is further configured to cause the UE to send a second NAS message to the AMF element with a container including a UE acknowledgement from the UE that the UE configuration parameter update was received. The second NAS message may comprise a NAS registration complete message or an Uplink NAS Transport message.

In another embodiment, the first NAS message comprises a Downlink NAS Transport message of a NAS transport procedure performed after a NAS registration procedure.

In another embodiment, when the Downlink NAS Transport message includes a UE acknowledgement indicator, the processor is further configured to cause the UE to send an Uplink NAS Transport message to the AMF element with a container including a UE acknowledgement from the UE that the UE configuration parameter update was received.

In another embodiment, when the first NAS message includes a re-registration indicator, the processor is further configured to cause the UE to initiate a NAS registration procedure to re-register using the updated UE configuration parameters.

Another embodiment comprises an AMF element that includes a means for receiving a control plane message from a UDM element including a UE configuration parameter update for a UE. The UE configuration parameter update is security protected according to a protection mechanism. The AMF element further includes a means for inserting the UE configuration parameter update that is security protected in a container of a first NAS message, and a means for sending the first NAS message to the UE with the container including the UE configuration parameter update that is security protected.

Another embodiment comprises a UE that includes a means for storing UE configuration parameters for the UE. The UE further includes a means for receiving a first NAS message from an AMF element having a container that includes a UE configuration parameter update for the UE that is security protected according to a protection mechanism, a means for performing a security check to verify the UE configuration parameter update, and a means for updating one or more of the UE configuration parameters based on the UE configuration parameter update when the UE configuration parameter update is verified.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

BRIEF DESCRIPTION OF THE DRAWINGS

Some embodiments of the invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
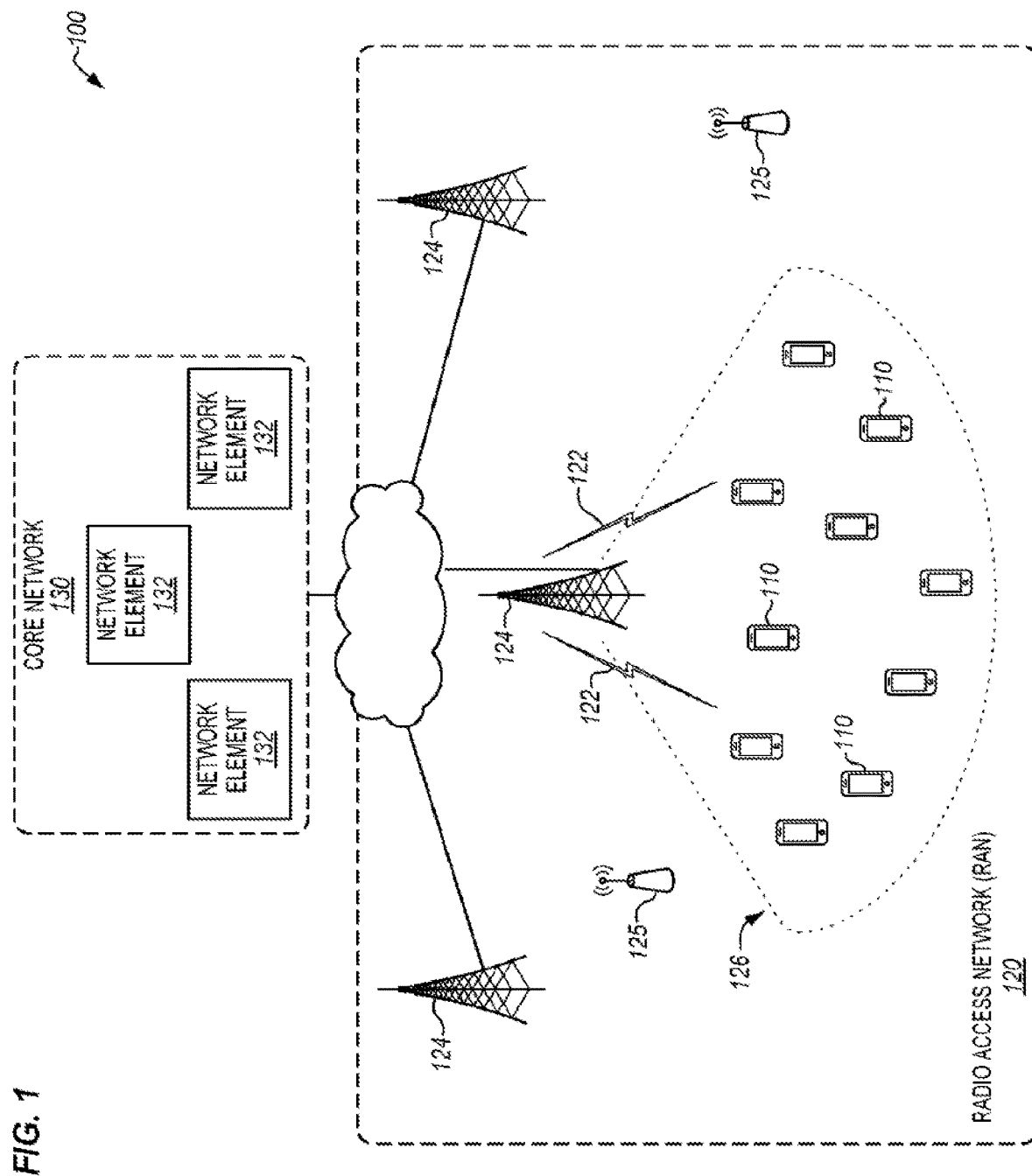
FIG. 1 illustrates a mobile network in an illustrative embodiment.

FIG. 1 illustrates a mobile network 100 in an illustrative embodiment. Mobile network 100 (also referred to as a cellular network) is a type of network where the last link is wireless, and provides voice and/or data services to a plurality of devices. Mobile network 100 may be a Third Generation (3G), a Fourth Generation (4G), and/or a next generation network (e.g., Fifth Generation (5G)).

Mobile network 100 is illustrated as providing communication services to UEs 110 (along with other UEs not shown). UEs 110 may be enabled for voice services, data services, Machine-to-Machine (M2M) or Machine Type Communications (MTC) services, Internet of Things (IoT) services, and/or other services. A UE 110 may be an end user device such as a mobile phone (e.g., smartphone), a tablet or PDA, a computer with a mobile broadband adapter, etc.

Mobile network 100 includes one or more Radio Access Networks (RAN) 120 that communicate with UEs 110 over a radio interface 122. RAN 120 may support Evolved-UMTS Terrestrial Radio Access Network (E-UTRAN) access, Wireless Local Area Network (WLAN) access, fixed access, satellite radio access, new Radio Access Technologies (RAT), etc. As an example, RAN 120 may comprise an E-UTRAN or Next Generation RAN (NG-RAN) that includes one or more base stations 124 that are dispersed over a geographic area. A base station 124 may comprise an entity that uses radio communication technology to communicate with a UE on the licensed spectrum, and interface the UE with a core network. Base stations 124 in an E-UTRAN are referred to as Evolved-NodeBs (eNodeB). Base stations 124 in an NG-RAN are referred to as gNodeBs (NR base stations) and/or ng-eNodeBs (LTE base stations supporting a 5G Core Network). As another example, RAN 120 may comprise a WLAN that includes one or more Wireless Access Points (WAP) 125. A WLAN is a network in which a UE is able to connect to a Local Area Network (LAN) through a wireless (radio) connection. A WAP 125 is a node that uses radio communication technology to communicate with a UE over the unlicensed spectrum, and provides the UE access to a core network. One example of WAP 125 is a WiFi access point that operates on the 2.4 GHz or 5 GHz radio bands. The term "base station" as used herein may refer to an eNodeB, a gNodeB, an ng-eNodeB, a WAP, etc.

UEs 110 are able to attach to cell 126 of RAN 120 to access a core network 130. RAN 120 therefore represents the radio interface between UEs 110 and core network 130. Core network 130 is the central part of mobile network 100 that provides various services to customers who are connected by RAN 120. One example of core network 130 is the Evolved Packet Core (EPC) network as suggested by the 3GPP for LTE. Another example of core network 130 is a 5G core network as suggested by the 3GPP. Core network 130 includes network elements 132, which may comprise servers, devices, apparatus, or equipment (including hardware) that provide services for UEs 110. Network elements 132, in an EPC network, may comprise a Mobility Management Entity (MME), a Serving Gateway (S-GW), a Packet Data Network Gateway (P-GW), etc. Network elements 132, in a 5G network, may comprise an Access and Mobility Management Function (AMF), a Session Management Function (SMF), a Policy Control Function (PCF), an Application Function (AF), a User Plane Function (UPF), etc.

Figure 2:
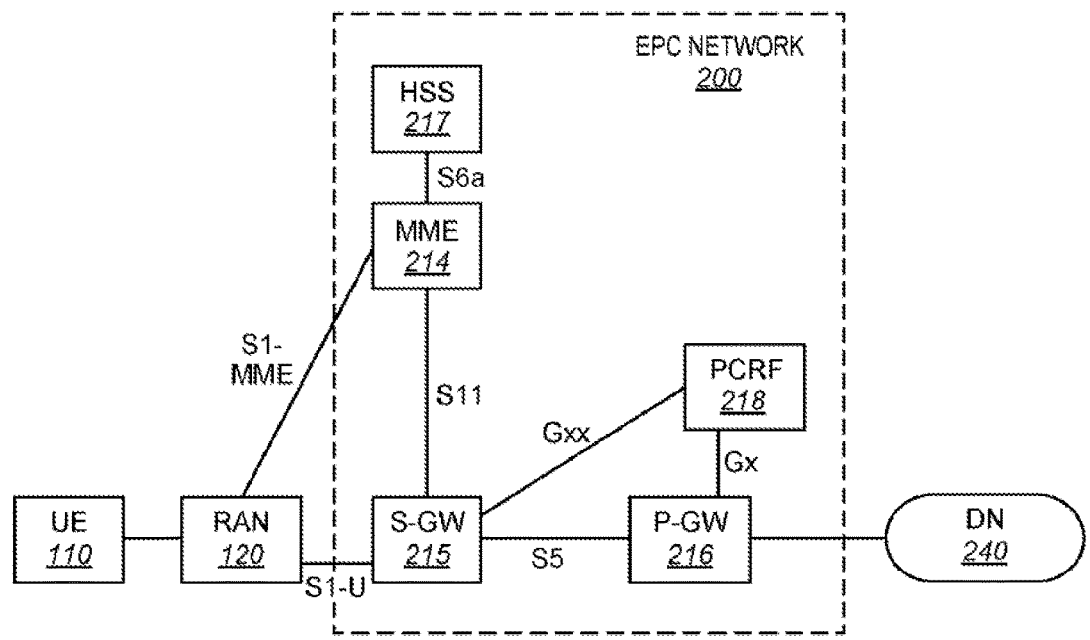
FIG. 2 illustrates an Evolved Packet Core (EPC) network.

FIG. 2 illustrates an Evolved Packet Core (EPC) network 200, which is the core network for LTE. EPC network 200 includes a Mobility Management Entity (MME) 214, a Serving Gateway (S-GW) 215, a Packet Data Network Gateway (P-GW) 216, a Home Subscriber Server (HSS) 217, and a Policy and Charging Rules Function (PCRF) 218, but may include other elements not shown, such as IP Multimedia Subsystem (IMS) Application Servers. Within the EPC network 200, the user data (also referred to as the "user plane") and the signaling (also referred to as the "control plane") are separated. MME 214 handles the control plane within EPC network 200. For instance, MME 214 handles the signaling related to mobility and security for E-UTRAN access. MME 214 is responsible for tracking and paging UE 110 in idle mode. S-GW 215 and P-GW 216 handle the user plane. S-GW 215 and P-GW 216 transport data traffic between UE 110 and external data networks 240 (DN or Packet Data Network (PDN)). S-GW 215 is the point of interconnect between the radio-side and EPC network 200, and serves UE 110 by routing incoming and outgoing IP packets. S-GW 215 is also the anchor point for the intra-LTE mobility (i.e., in case of handover between eNodeBs), and between LTE and other 3GPP accesses. P-GW 216 is the point of interconnect between EPC network 200 and external data networks 240 (i.e., point of ingress or egress for data network 240), and routes packets to and from data network 240. HSS 217 is a database that stores user-related and subscriber-related information. PCRF 218 provides a Policy and Charging Control (PCC) solution in EPC network 200, and is a node or entity of EPC network 200 that formulates PCC rules for services requested by an end user.

MME 214 connects to RAN 120 (i.e., eNodeB) through the S1-MME interface, and S-GW 215 connects to RAN 120 through the S1-U interface. MME 214 connects to S-GW 215 through the S11 interface, and connects to HSS 217 through the S6a interface. PCRF 218 connects to P-GW 216 through the Gx interface, which provides the transfer of policy and charging rules from PCRF 218 to a Policy and Charging Enforcement Function (PCEF) in P-GW 216. PCRF 218 connects to S-GW 215 through the Gxx interface, and S-GW 215 connects to P-GW 216 through the S5 interface.

Figure 3:
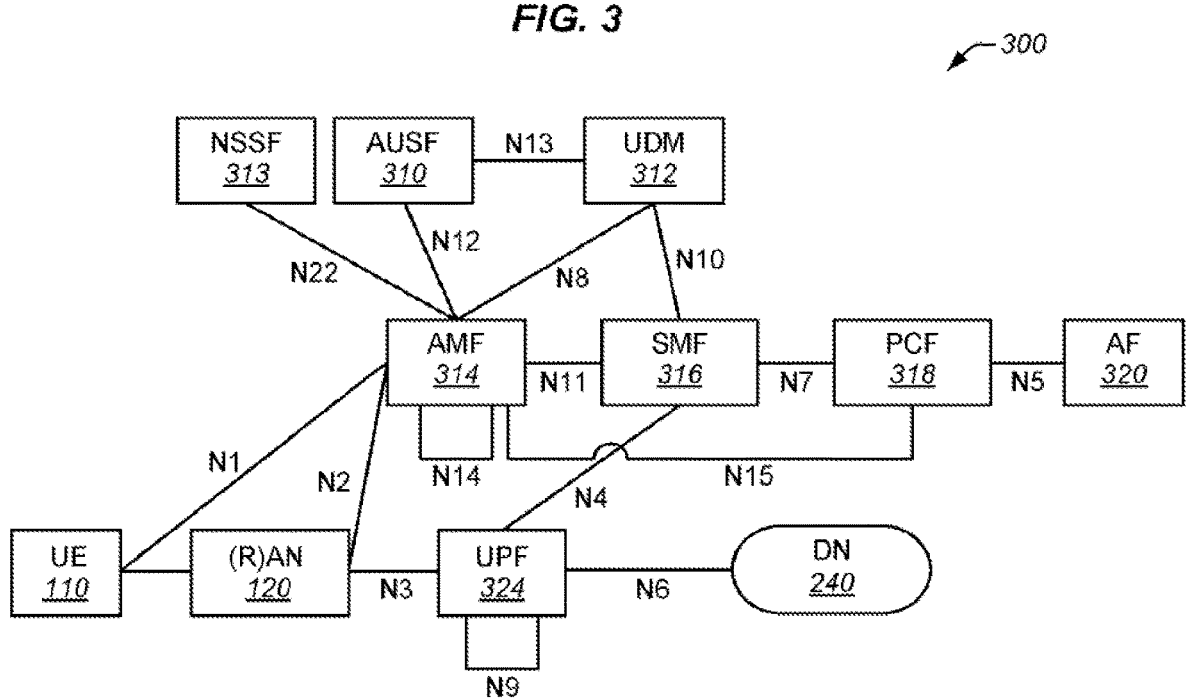
FIG. 3 illustrates a non-roaming architecture of a next generation network.

FIG. 3 illustrates a non-roaming architecture 300 of a next generation network. The architecture in FIG. 3 is a reference point representation, as is further described in 3GPP TS 23.501 (v15.3.0), which is incorporated by reference as if fully included herein. Architecture 300 is comprised of Network Functions (NF) for a core network, and the network functions for the control plane are separated from the user plane. The control plane of the core network includes an Authentication Server Function (AUSF) 310, a Unified Data Management (UDM) 312, a Network Slice Selection Function (NSSF) 313, an Access and Mobility Management Function (AMF) 314, a Session Management Function (SMF) 316, a Policy Control Function (PCF) 318, and an Application Function (AF) 320. The user plane of the core network includes one or more User Plane Functions (UPF) 324 that communicate with data network 240. UE 110 is able to access the control plane and the user plane of the core network through (R)AN 120.

AUSF 310 is configured to support authentication of UE 110. UDM 312 is configured to store subscription data/information for UE 110. UDM 312 may store three types of user data: subscription, policy, and session-related context (e.g., UE location). AMF 314 is configured to provide UE-based authentication, authorization, mobility management, etc. SMF 316 is configured to provide the following functionality: session management (SM), UE Internet Protocol (IP) address allocation and management, selection and control of UPF(s), termination of interfaces towards PCF 318, control part of policy enforcement and Quality of Service (QoS), lawful intercept, termination of SM parts of NAS messages, Downlink Data Notification (DNN), roaming functionality, handle local enforcement to apply QoS for Service Level Agreements (SLAs), charging data collection and charging interface, etc. If UE 110 has multiple sessions, different SMFs may be allocated to each session to manage them individually and possibly provide different functionalities per session. PCF 318 is configured to support a unified policy framework to govern network behavior, and to provide policy rules to control plane functions for QoS enforcement, charging, access control, traffic routing, etc. AF 320 provides information on a packet flow to PCF 318. Based on the information, PCF 318 is configured to determine policy rules about mobility and session management to make AMF 314 and SMF 316 operate properly.

UPF 324 supports various user plane operations and functionalities, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. Data network 240 is not part of the core network, and provides Internet access, operator services, $3^{rd}$ party services, etc. For instance, the International Telecommunication Union (ITU) has classified 5G mobile network services into three categories: Enhanced Mobile Broadband (eMBB), Ultra-reliable and Low-Latency Communications (uRLLC), and Massive Machine Type Communications (mMTC) or Massive Internet of Things (MIoT). eMBB focuses on services that have high bandwidth requirements, such as HD videos, Virtual Reality (VR), and Augmented Reality (AR). uRLLC focuses on latency-sensitive services, such as automated driving and remote management. mMTC and MIoT focuses on services that include high requirements for connection density, such as smart city and smart agriculture. Data network 240 may be configured to provide these and other services.

Architecture 300 includes the following reference points. The N1 reference point is implemented between UE 110 and AMF 314. The N2 reference point is implemented between (R)AN 120 and AMF 314. The N3 reference point is implemented between (R)AN 120 and UPF 324. The N4 reference point is implemented between the SMF 316 and UPF 324. The N5 reference point is implemented between PCF 318 and AF 320. The N6 reference point is implemented between UPF 324 and data network 240. The N7 reference point is implemented between the SMF 316 and PCF 318. The N8 reference point is implemented between UDM 312 and AMF 314. The N9 reference point is implemented between two UPFs 324. The N10 reference point is implemented between UDM 312 and SMF 316. The N11 reference point is implemented between AMF 314 and SMF 316. The N12 reference point is implemented between AMF 314 and AUSF 310. The N13 reference point is implemented between UDM 312 and AUSF 310. The N14 reference point is implemented between two AMFs (e.g., 314). The N15 reference point is implemented between PCF 318 and AMF 314 in the case of a non-roaming scenario. The N22 reference point is implemented between NSSF 313 and AMF 314.

Figure 4:
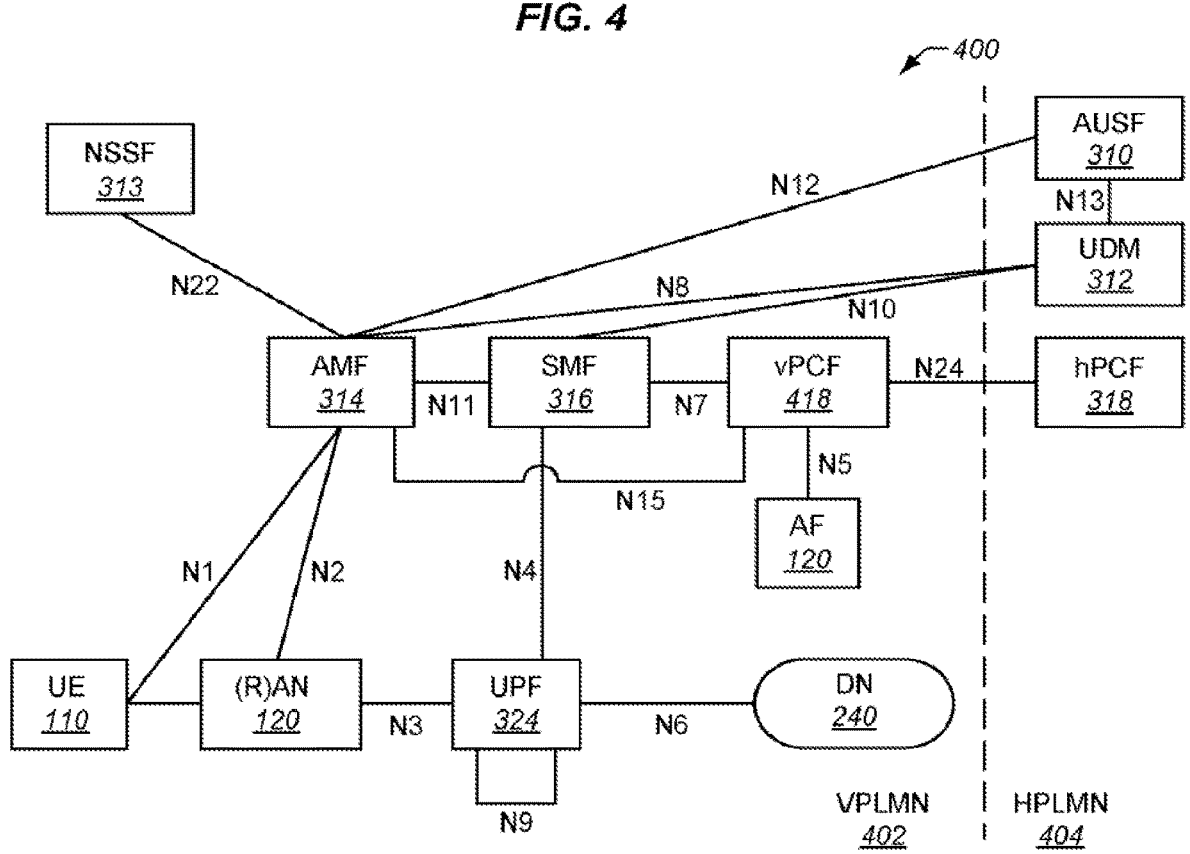
FIG. 4 illustrates a roaming architecture of a next generation network.

FIG. 4 illustrates a roaming architecture 400 of a next generation network. The roaming architecture 400 in FIG. 4 is a local breakout scenario in reference point representation, as is further described in 3GPP TS 23.501 (v15.3.0). In a roaming scenario, a Visited Public Land Mobile Network (VPLMN) 402 and a Home PLMN (HPLMN) 404 are shown. An HPLMN 404 identifies the PLMN in which the profile of a mobile subscriber is held. A VPLMN 402 is a PLMN upon which the mobile subscriber has roamed when leaving their HPLMN 404. Users roaming to other networks will receive subscription information from the HPLMN 404. In a local breakout scenario, PCF 318 (hPCF), UDM 312, and AUSF 310 are in the HPLMN 404 for UE 110. The other network functions, including a visited PCF (vPCF) 418, are in the VPLMN 402.

Figure 5:
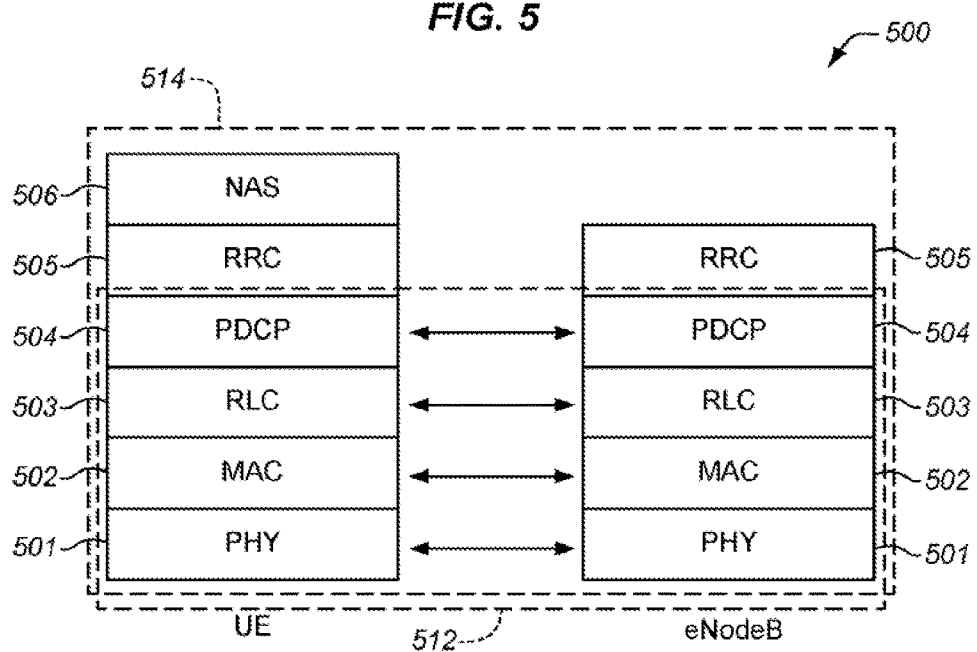
FIG. 5 illustrates a radio protocol stack.

FIG. 5 illustrates a radio protocol stack 500, such as for radio interface 122. As described herein, the user plane 512 comprises a set of protocols used to transfer the actual user data through a network, and the control plane 514 comprises protocols used to control and establish the user connections and bearers within the network. For the user plane 512 and the control plane 514, radio protocol stack 500 includes the physical (PHY) layer 501, the Medium Access Control (MAC) layer 502, the Radio Link Control (RLC) layer 503, and the Packet Data Convergence Protocol (PDCP) layer 504. The control plane 514 additionally includes the Radio Resource Control (RRC) layer 505 and the Non-Access Stratum (NAS) layer 506.

The physical layer 501 carries all information from the MAC transport channels over the radio interface. Data and signaling messages are carried on physical channels between the different levels of physical layer 501. The physical channels are divided into physical data channels and physical control channels. The physical data channels may include the Physical Downlink Shared Channel (PDSCH), the Physical Broadcast Channel (PBCH), the Physical Multicast Channel (PMCH), the Physical Uplink Shared Channel (PUSCH), and the Physical Random Access Channel (PRACH). The physical control channels may include the Physical Control Format Indicator Channel (PCFICH), the Physical Hybrid ARQ Indicator Channel (PHICH), the Physical Downlink Control Channel (PDCCH), and the Physical Uplink Control Channel (PUCCH).

The MAC layer 502 is responsible for mapping between logical channels and transport channels, multiplexing of MAC Service Data Units (SDUs) from one or different logical channels onto transport blocks (TB) to be delivered to the physical layer on transport channels, de-multiplexing of MAC SDUs from one or different logical channels from transport blocks delivered from the physical layer on transport channels, scheduling information reporting, error correction through Hybrid Automatic Repeat Request (HARQ), priority handling between UEs by means of dynamic scheduling, priority handling between logical channels of one UE, and logical channel prioritization. The RLC layer 503 is responsible for transfer of upper layer Protocol Data Units (PDUs), error correction through ARQ, and concatenation, segmentation and reassembly of RLC SDUs. The RLC layer 503 is also responsible for re-segmentation of RLC data PDUs, reordering of RLC data PDUs, duplicate detection, RLC SDU discard, RLC re-establishment, and protocol error detection. The PDCP layer 504 is responsible for header compression and decompression of IP data, transfer of data (user plane or control plane), maintenance of PDCP Sequence Numbers (SNs), in-sequence delivery of upper layer PDUs at re-establishment of lower layers, duplicate elimination of lower layer SDUs at re-establishment of lower layers for radio bearers mapped on RLC Acknowledged Mode (AM), ciphering and deciphering of user plane data and control plane data, integrity protection and integrity verification of control plane data, timer-based discard, duplicate discarding, etc. The RRC layer 505 is responsible for the broadcast of System Information related to the NAS, broadcast of System Information related to the Access Stratum (AS), paging, establishment, maintenance, and release of an RRC connection between the UE and RAN, security functions including key management, establishment, configuration, maintenance, and release of point-to-point Radio Bearers (RB). The NAS layer 506 represents the highest stratum of the control plane 514 between the UE and the core network (e.g., MME/AMF), and supports the mobility of the UE and the session management procedures to establish and maintain IP connectivity between the UE and the core network.

Each UE 110 receiving services from a mobile network is provisioned with configuration parameters. The home network (i.e., HPLMN) may want to update one or more of the configuration parameters in a UE. In prior mobile networks, updating of configuration parameters was performed with an Over-The-Air (OTA) mechanism. The OTA mechanism required deployment of a dedicated network element called an OTA Gateway. When an update to configuration parameters was performed, the network operator's back-end system sent service requests to the OTA Gateway. Different OTA "bearers" were specified to send the service request to the UE, such as Short Message Services (SMS), Unstructured Supplementary Service Data (USSD), HyperText Transfer Protocol (HTTP), etc. The OTA Gateway mapped the service requests into OTA "bearers" for the service requests to be sent to the UE. For example, when an SMS bearer was used, the OTA Gateway encapsulated the updated configuration parameters into one or more SMS messages. The OTA Gateway then sent the SMS messages to an SMS Center (SMSC), which transmitted the SMS messages to the UE. It is desirable to provide a native control plane solution that a network operator may use to update UE configuration parameters without having to deploy a dedicated network element, such as an OTA Gateway. It is also desirable to provide a solution where the UE configuration parameters are security protected.

In the embodiments described herein, the network sends a security-protected UE configuration parameter update transparently to a UE via a control plane NAS message. For example, the UE configuration parameter update may be security protected using a secured packet, using an integrity protection key of a NAS security context, or both. Upon receipt of the UE configuration parameter update in a NAS message, the UE may update its UE configuration parameters. The solution provided herein is described in relation to a next generation network (e.g., 5G), but similar solutions may be provided in earlier or later generation networks. Further details of the embodiments are provided below.

Figure 6:
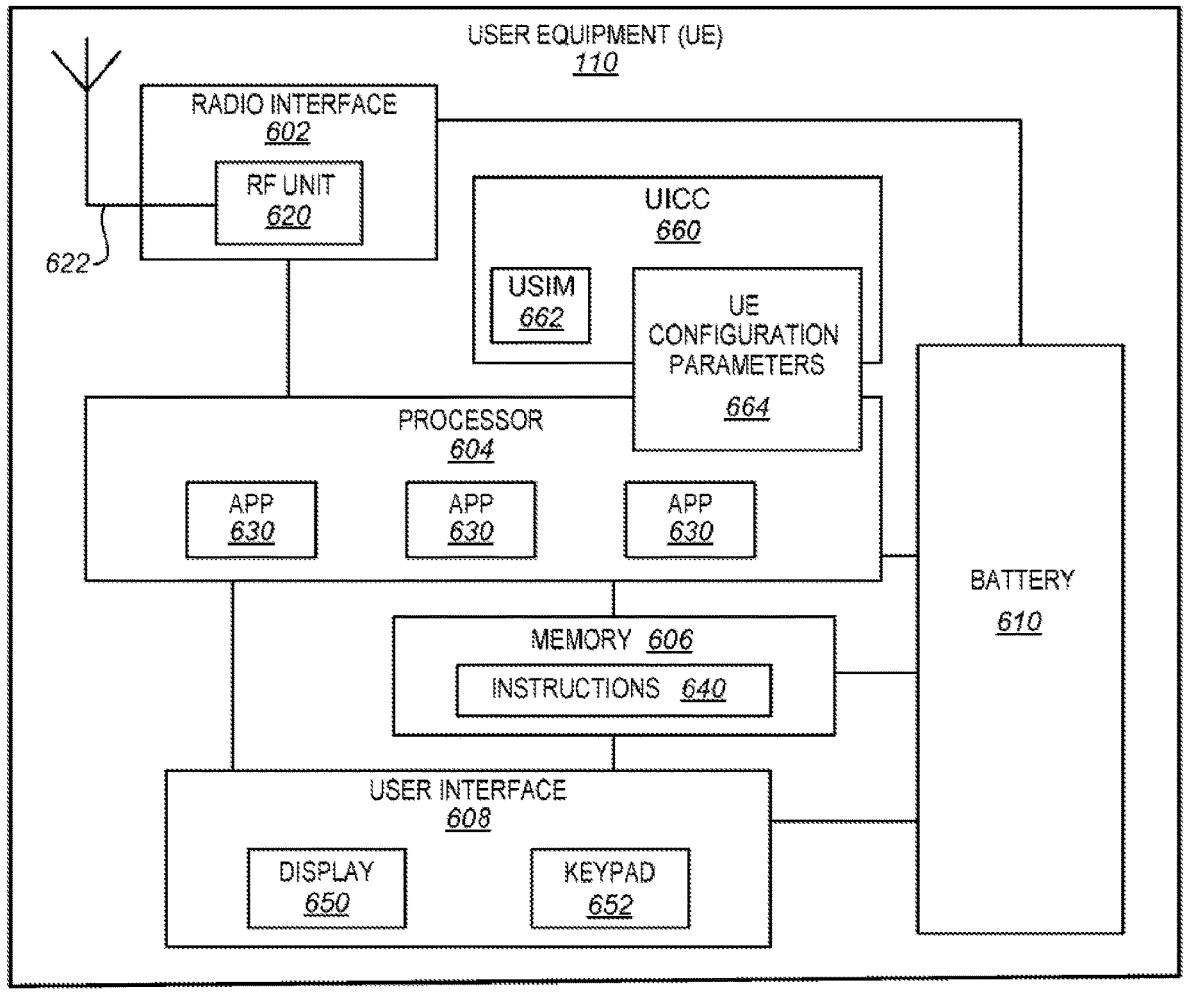
FIG. 6 is a block diagram of a UE in an illustrative embodiment.

FIG. 6 is a block diagram of a UE 110 in an illustrative embodiment. UE 110 includes a radio interface component 602, one or more processors 604, a memory 606, a user interface component 608, and a battery 610. Radio interface component 602 is a hardware component that represents the local radio resources of UE 110, such as an RF unit 620 (e.g., transceiver) and one or more antennas 622, used for wireless communications with a base station (e.g., base station 124) via radio or "over-the-air" signals. Processor 604 represents the internal circuitry, logic, hardware, software, etc., that provides the functions of UE 110. Processor 604 may be configured to execute instructions 640 for software that are loaded into memory 606. Processor 604 may comprise a set of one or more processors or may comprise a multi-processor core, depending on the particular implementation. Processor 604 may implement one or more applications 630. These applications 630 may access downlink (DL) data through RAN 120 and core network 130, and may also generate uplink (UL) data for transfer to a destination through RAN 120 and core network 130. Memory 606 is a computer readable storage medium for data, instructions 640, applications, etc., and is accessible by processor 604. Memory 606 is a hardware storage device capable of storing information on a temporary basis and/or a permanent basis.

Memory 606 may comprise a Random-Access Memory (RAM), or any other volatile or non-volatile storage device. User interface component 608 is a hardware component for interacting with an end user. For example, user interface component 608 may include a display 650, screen, touch screen, or the like (e.g., a Liquid Crystal Display (LCD), a Light Emitting Diode (LED) display, etc.). User interface component 608 may include keyboard or keypad 652, a tracking device (e.g., a trackball or trackpad), a speaker, a microphone, etc.

UE 110 also includes a Universal Integrated Circuit Card (UICC) 660, which is a hardware device that provides security and integrity functions for UE 110. Although not shown in FIG. 6, UICC 660 may include a processor (i.e., Central Processing Unit (CPU)), memory (e.g., Read-Only Memory (ROM), RAM, Electrically Erasable Programmable Read-Only Memory (EEPROM), and Input/Output (I/O) circuits. UICC 660 may host or store a Universal Subscriber Identity Module (USIM) 662 that stores information, such as the International Mobile Subscriber Identity (IMSI), security authentication and ciphering information, and other home operator configuration information.

UICC 660 and/or memory 606 may store home operator information that is used to configure UE 110, which is referred to herein as UE configuration parameters 664. One or more of the UE configuration parameters 664 may be used exclusively by UICC 660, and one or more of the UE configuration parameters 664 may be used by processor 604. The UE configuration parameters 664 may include a Routing Indicator, a home network identifier (e.g., a PLMN Identity and MCC/MNC information), a home network protection scheme identifier, a home network public key identifier, home network public certificates, network selection information (e.g., Operator-Controlled PLMN Selector with Access Technology list), and/or other information. UE configuration parameters 664 may represent the data pre-provisioned by a network operator, or data provisioned by the network, such as through an update procedure as discussed below. UE 110 may include various other components not specifically illustrated in FIG. 6.

Figure 7:
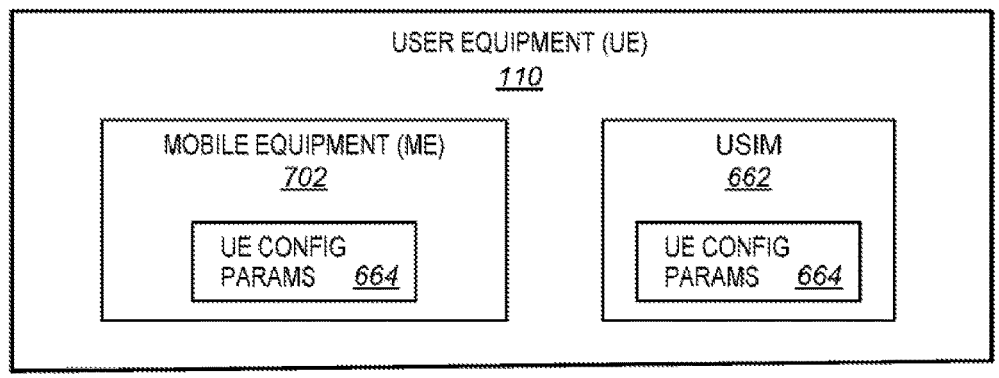
FIG. 7 is a functional model for a UE in an illustrative embodiment.

FIG. 7 is a functional model for UE 110 in an illustrative embodiment. UE 110 may be sub-divided into domains, such as Mobile Equipment (ME) 702 and USIM 662. As described above, the functions for USIM 662 may be performed by a processor and memory on UICC 660. The functions for ME 702 may be performed by processor 604 and memory 606. ME 702 performs radio transmission and contains applications. USIM 662 contains data and procedures which unambiguously and securely identify itself. These functions are typically embedded in a stand-alone smart card, such as UICC 660. As stated above, one or more of the UE configuration parameters 664 may be stored exclusively in USIM 662 for use or handling within UICC 660, and one or more of the UE configuration parameters 664 may be stored exclusively in ME 702 for use or handling within ME 702.

Figure 8:
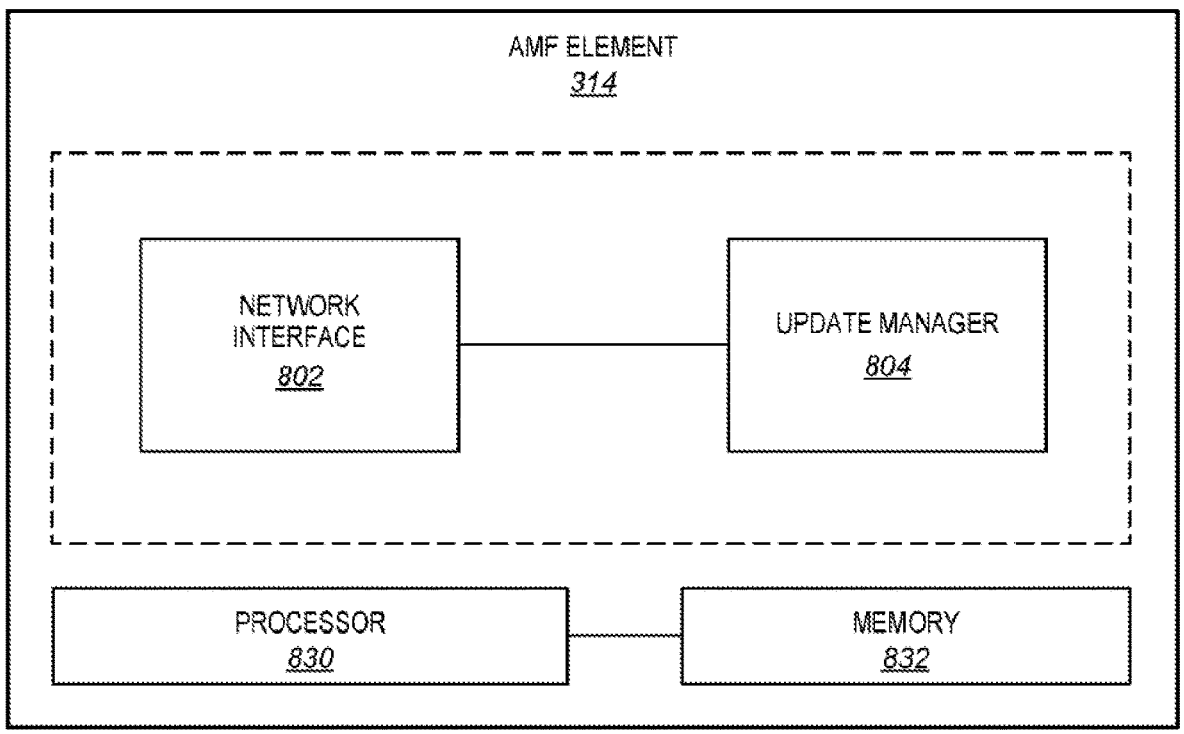
FIG. 8 is a block diagram of an AMF element in an illustrative embodiment.

FIG. 8 is a block diagram of an AMF element 314 in an illustrative embodiment. As described above, an AMF element 314 is configured to provide UE-based authentication, authorization, mobility management, etc. In this embodiment, AMF element 314 includes the following subsystems: a network interface component 802 and an update manager 804 that operate on one or more platforms. Network interface component 802 may comprise circuitry, logic, hardware, means, etc., configured to exchange control plane messages or signaling with other network elements and/or UEs (e.g., through RAN 120). Network interface component 802 may operate using a variety of protocols (including NAS protocol) or reference points. Update manager 804 may comprise circuitry, logic, hardware, means, etc., configured to handle updates for UE configuration parameters on UEs. One or more of the subsystems of AMF element 314 may be implemented on a hardware platform comprised of analog and/or digital circuitry. One or more of the subsystems of AMF element 314 may be implemented on a processor 830 that executes instructions stored in memory 832. Processor 830 comprises an integrated hardware circuit configured to execute instructions, and memory 832 is a non-transitory computer readable storage medium for data, instructions, applications, etc., and is accessible by processor 830. AMF element 314 may include various other components not specifically illustrated in FIG. 8.

Figure 9:
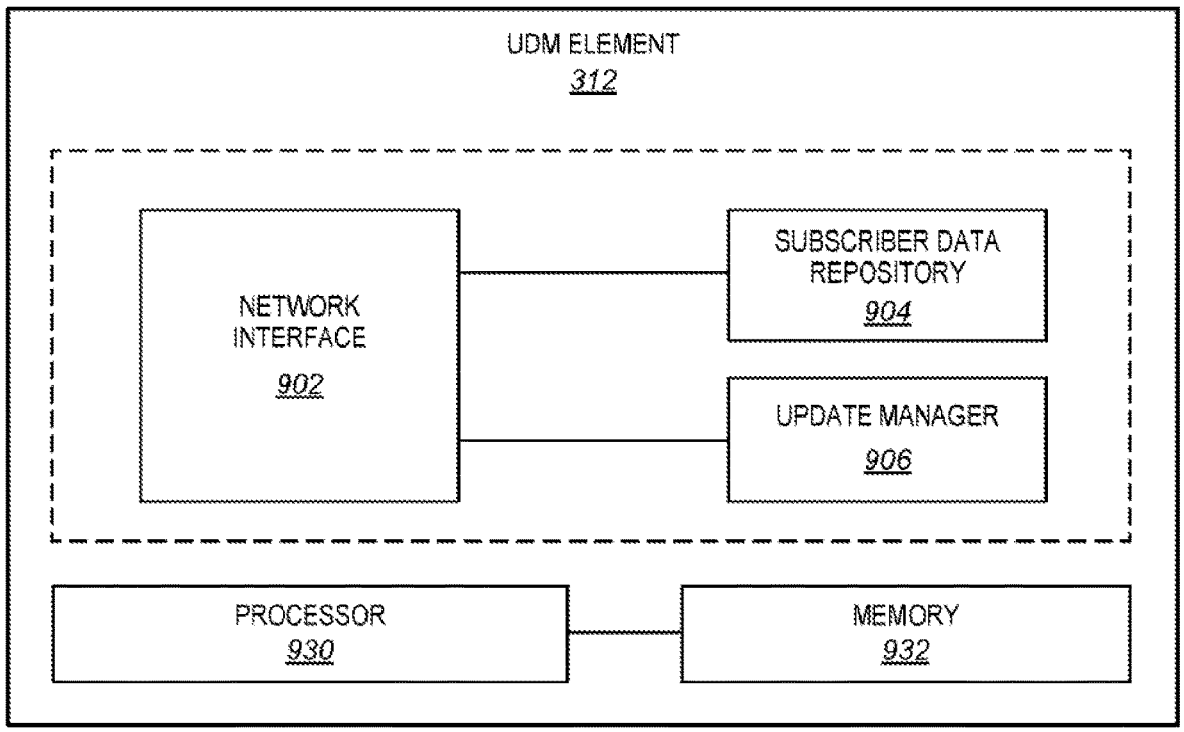
FIG. 9 is a block diagram of a UDM element in an illustrative embodiment.

FIG. 9 is a block diagram of a UDM element 312 in an illustrative embodiment. As described above, a UDM element 312 is configured to store access and mobility subscription data for UEs. In this embodiment, UDM element 312 includes the following subsystems: a network interface component 902, a subscriber data repository 904, and an update manager 906 that operate on one or more platforms. Network interface component 902 may comprise circuitry, logic, hardware, means, etc., configured to exchange control plane messages or signaling with other network elements. Network interface component 902 may operate using a variety of protocols or reference points. Subscriber data repository 904 may comprise circuitry, logic, hardware, means, etc., configured to store access and mobility subscription data. Update manager 906 may comprise circuitry, logic, hardware, means, etc., configured to handle updates for UE configuration parameters on UEs. One or more of the subsystems of UDM element 312 may be implemented on a hardware platform comprised of analog and/or digital circuitry. One or more of the subsystems of UDM element 312 may be implemented on a processor 930 that executes instructions stored in memory 932. UDM element 312 may include various other components not specifically illustrated in FIG. 9.

Figure 10:
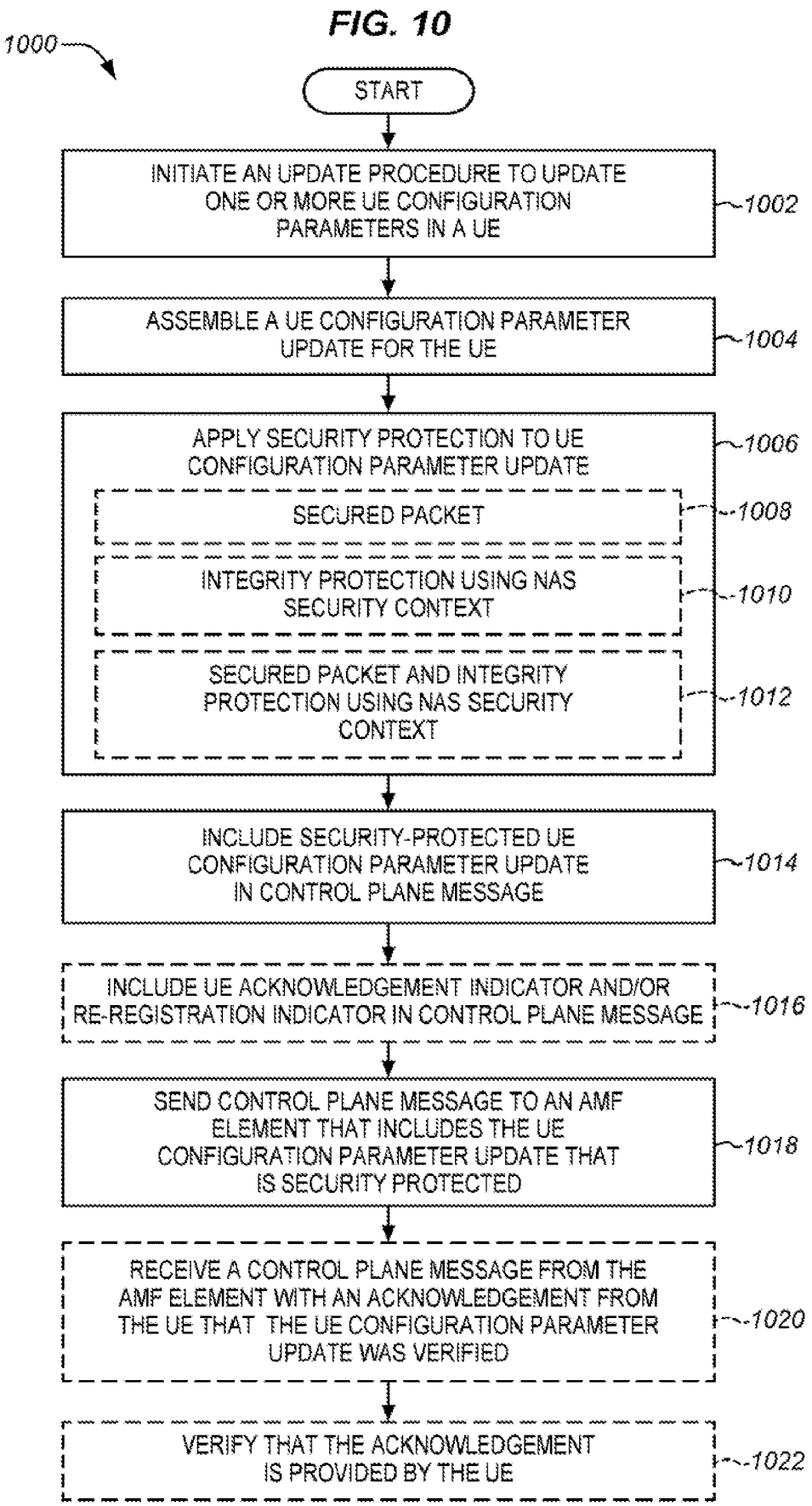
FIG. 10 is a flow chart illustrating a method of performing an update procedure in a UDM element in an illustrative embodiment.
Figure 11:
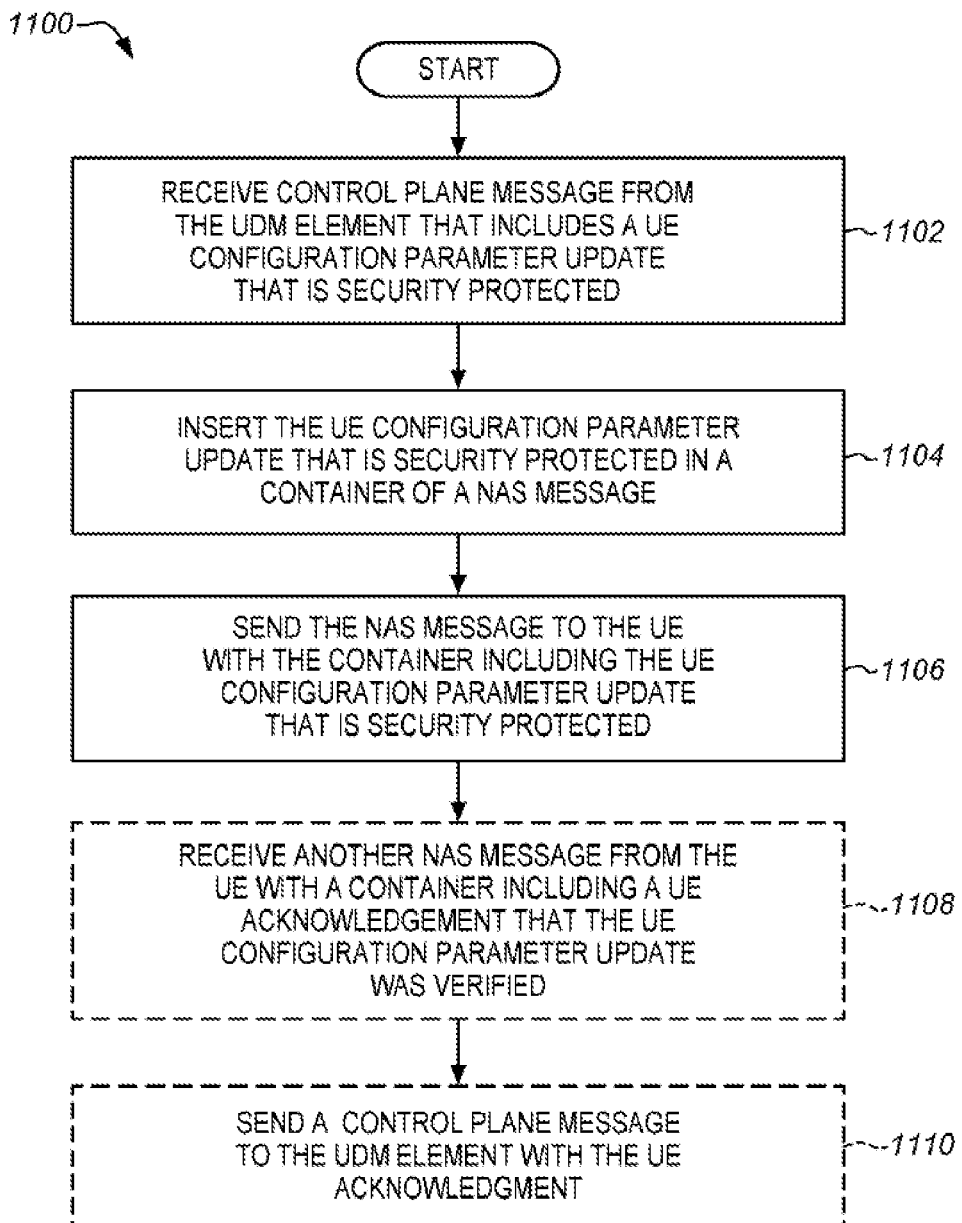
FIG. 11 is a flow chart illustrating a method of performing an update procedure in an AMF element in an illustrative embodiment.
Figure 12:
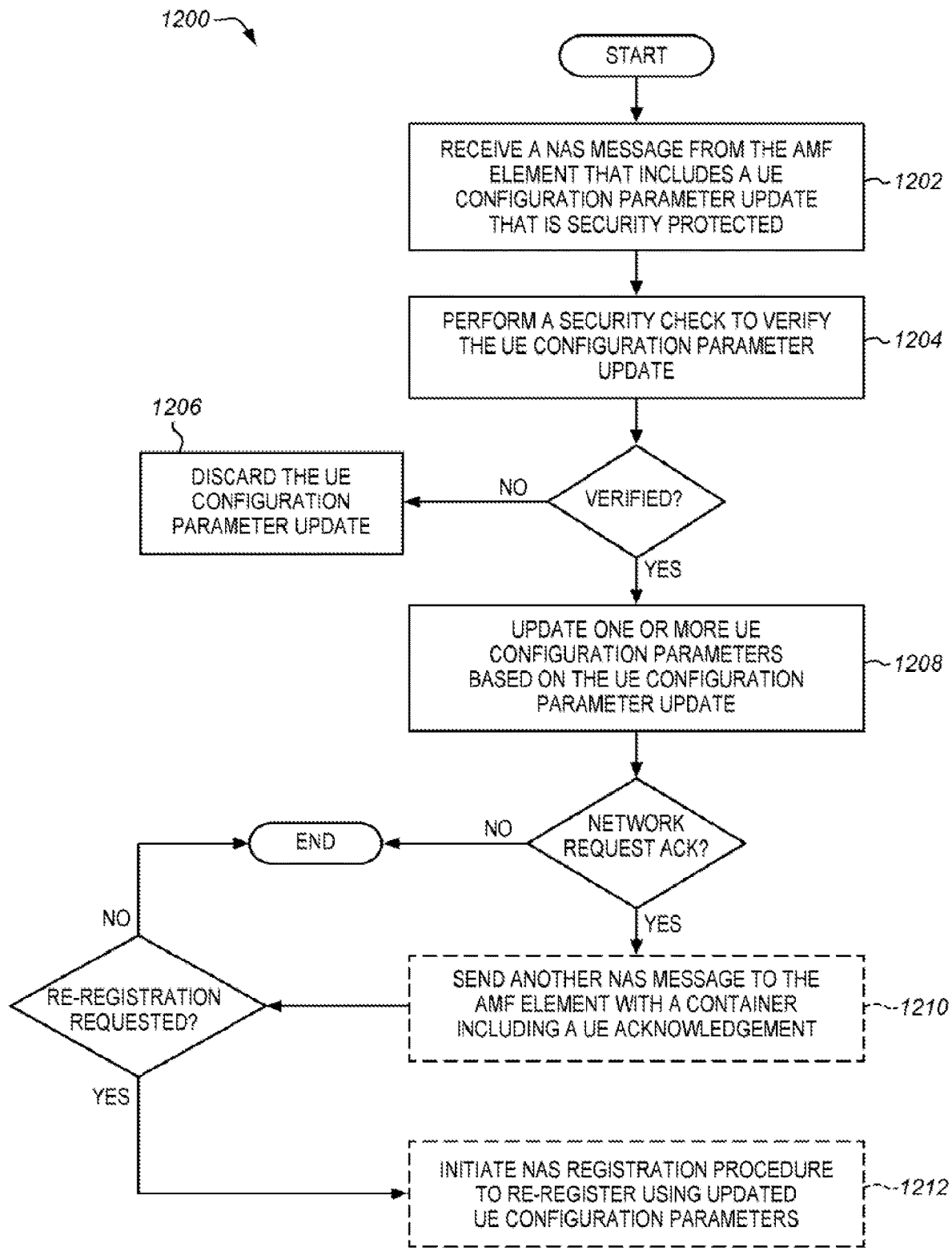
FIG. 12 is a flow chart illustrating a method of performing an update procedure in a UE in an illustrative embodiment.

An update procedure may be performed or invoked when a UE registers with the network, or after the UE registers with the network. FIGS. 10-12 illustrate a general update procedure performed by UDM element 312, AMF element 314, and UE 110. Further details of an update procedure are described in the example message diagrams below. Therefore, the flow charts provided herein may be supplemented by the update procedures described in relation to the message diagrams.

FIG. 10 is a flow chart illustrating a method 1000 of performing an update procedure in a UDM element 312 in an illustrative embodiment. The steps of method 1000 will be described with reference to UDM element 312 in FIG. 9, but those skilled in the art will appreciate that method 1000 may be performed in other network elements or devices. Also, the steps of the flow charts described herein are not all inclusive and may include other steps not shown, and the steps may be performed in an alternative order.

It may be assumed for this embodiment that UE 110 is registering with the network via a NAS registration procedure, or is already registered with the network. Update manager 906 of UDM element 312 initiates an update procedure to update one or more of the UE configuration parameters 664 in UE 110 (step 1002). For example, update manager 906 may process the UE configuration information stored in subscriber data repository 904, and determine that an update to the UE configuration parameters 664 is needed or desired. Update manager 906 assembles a UE configuration parameter update for UE 110 (step 1004). The UE configuration parameter update comprises information, a command, instruction, etc., used to perform an update of UE configuration parameters 664 in UE 110. For example, a UE configuration parameter update may include one or more updated UE configuration parameters for UE 110 as part of access and mobility subscription data.

Update manager 906 applies security protection to the UE configuration parameter update (step 1006) according to one or more protection mechanisms. In one embodiment, the protection mechanism may be a secured packet. Thus, update manager 906 may configure or encapsulate the UE configuration parameter update in a secured packet to apply security protection (optional step 1008). Generally, a secured packet contains application messages to which certain mechanisms have been applied. Application messages are commands or data exchanged between a network element and a UICC. The sender prepends a Security Header (the Command Header) to the Application Message, and then applies the requested security to part of the Command Header and all of the Application Message. The resulting structure is referred to as the (Secured) Command Packet that includes the secured data as payload. Update manager 906 may access a local secured packet library or a remote secured packet library to configure or encapsulate the UE configuration parameter update in a secured packet. In another embodiment, the protection mechanism may be integrity protection. Thus, update manager 906 may employ integrity protection on the UE configuration parameter update using a NAS security context for UE 110 (optional step 1010). NAS security is used to securely deliver NAS signaling messages between UE 110 and AMF element 314 in the control plane using NAS security keys. A NAS security context is a collection of NAS security keys and parameters used to protect NAS messages. The NAS security keys are generated when UE 110 is authenticated to the network. Thus, after authentication, update manager 906 may employ integrity protection on the UE configuration parameter update using an integrity protection key of the NAS security context. In yet another embodiment, update manager 906 may use both a secured packet and the NAS security context to protect the UE configuration parameter update (optional step 1012). Update manager 906 may then insert or otherwise include the security-protected UE configuration parameter update in a control plane message (step 1014).

Update manager 906 may also insert or otherwise include a UE acknowledgement indicator in the control plane message (optional step 1016). A UE acknowledgement indicator may be included when the home network wants an acknowledgement from UE 110 of a successful security check of the UE configuration parameter update. Update manager 906 may also insert or otherwise include a re-registration indicator in the control plane message (optional step 1016). A re-registration indicator may be included when the home network wants UE 110 to re-register with the network with updated UE configuration parameters. Update manager 906 then sends the control plane message to AMF element 314 that includes the security-protected UE configuration parameter update (step 1018) and the UE acknowledgement indicator and/or the re-registration indicator (if requested), through network interface component 902.

FIG. 11 is a flow chart illustrating a method 1100 of performing an update procedure in an AMF element 314 in an illustrative embodiment. The steps of method 1100 will be described with reference to AMF element 314 in FIG. 8, but those skilled in the art will appreciate that method 1100 may be performed in other network elements or devices.

Update manager 804 of AMF element 314 receives the control plane message from UDM element 312 that includes the security-protected UE configuration parameter update (step 1102) through network interface component 802. Update manager 804 inserts the security-protected UE configuration parameter update in a container of a NAS message (step 1104). A transmission of the security-protected UE configuration parameter update is considered "transparent" to AMF element 314. Thus, update manager 804 is programmed to forward the security-protected UE configuration parameter update without modifying or changing the UE configuration parameter update. Update manager 804 may therefore insert the security-protected UE configuration parameter update received in the control plane message from UDM element 312 into a "transparent" container that is designated for the UE configuration parameter update. One example of a transparent container such as this is described in more detail below.

The type of NAS message used by AMF element 314 to transport the security-protected UE configuration parameter update may depend on the NAS procedure being performed. For example, when a NAS registration procedure is being performed, the NAS message may comprise a NAS registration accept message. When a NAS transport procedure is being performed, the NAS message may comprise a DL NAS Transport message. Update manager 804 then sends the NAS message to UE 110 (step 1106) through network interface component 802.

FIG. 12 is a flow chart illustrating a method 1200 of performing an update procedure in UE 110 in an illustrative embodiment. The steps of method 1200 will be described with reference to UE 110 in FIGS. 6-7, but those skilled in the art will appreciate that method 1200 may be performed in other devices.

UE 110 (e.g., through ME 702) receives the NAS message from AMF element 314 (step 1202). ME 702 or USIM 662 performs a security check to verify that the security-protected UE configuration parameter update included in the container of the NAS message is provided by the home network (i.e., HPLMN) for UE 110 (step 1204). For example, ME 702 or USIM 662 may calculate a checksum to determine whether the security-protected UE configuration parameter update that was received matches the security-protected UE configuration parameter update sent by UDM element 312. When the security check is not successful, ME 702 or USIM 662 discards the security-protected UE configuration parameter update (step 1206). When the security check is successful, ME 702 or USIM 662 updates one or more UE configuration parameters 664 provisioned in UE 110 based on the UE configuration parameter update (step 1208). As described above, the UE configuration parameter update may be encapsulated in a secured packet. In this scenario, USIM 662 is configured to decode or unpack the UE configuration parameter update from the secured packet using a secured packet library. USIM 662 then updates one or more UE configuration parameters 664 local to USIM 662 based on the UE configuration parameter update.

When the NAS message includes a UE acknowledgement indicator, ME 702 or USIM 662 sends a NAS message to AMF element 314 with a container including a UE acknowledgement (optional step 1210). A transmission of the UE acknowledgement is considered "transparent" to AMF element 314. Thus, ME 702 or USIM 662 is programmed to insert the UE acknowledgement into a "transparent" container that is designated for the UE acknowledgement. One example of a transparent container such as this is described in more detail below.

The type of NAS message may depend on the NAS procedure being performed. For example, when a NAS registration procedure is being performed, the NAS message may comprise a NAS registration complete message or a UL NAS Transport message. When a NAS transport procedure is being performed, the NAS message may comprise a UL NAS Transport message.

In FIG. 11, update manager 804 of AMF element 314 receives the NAS message from UE 110 with a container including the UE acknowledgement (optional step 1108) through network interface component 802. Update manager 804 then sends a control plane message to UDM element 312 with the UE acknowledgement (optional step 1110) through network interface component 802. In FIG. 10, update manager 906 of UDM element 312 receives the control plane message with the UE acknowledgement from AMF element 314 (optional step 1020) through network interface component 902. Update manager 906 then verifies that the UE acknowledgement is provided by UE 110 (optional step 1022).

In FIG. 12, when the NAS message from AMF element 314 includes a re-registration indicator, UE 110 (such as through ME 702) initiates a NAS registration procedure to re-register using the updated UE configuration parameters (optional step 1212). The update procedure may then end.

The following provides examples of performing an update procedure in further embodiments.

Example 1: Update Procedure During Registration Using Secured Packet

Figure 13:
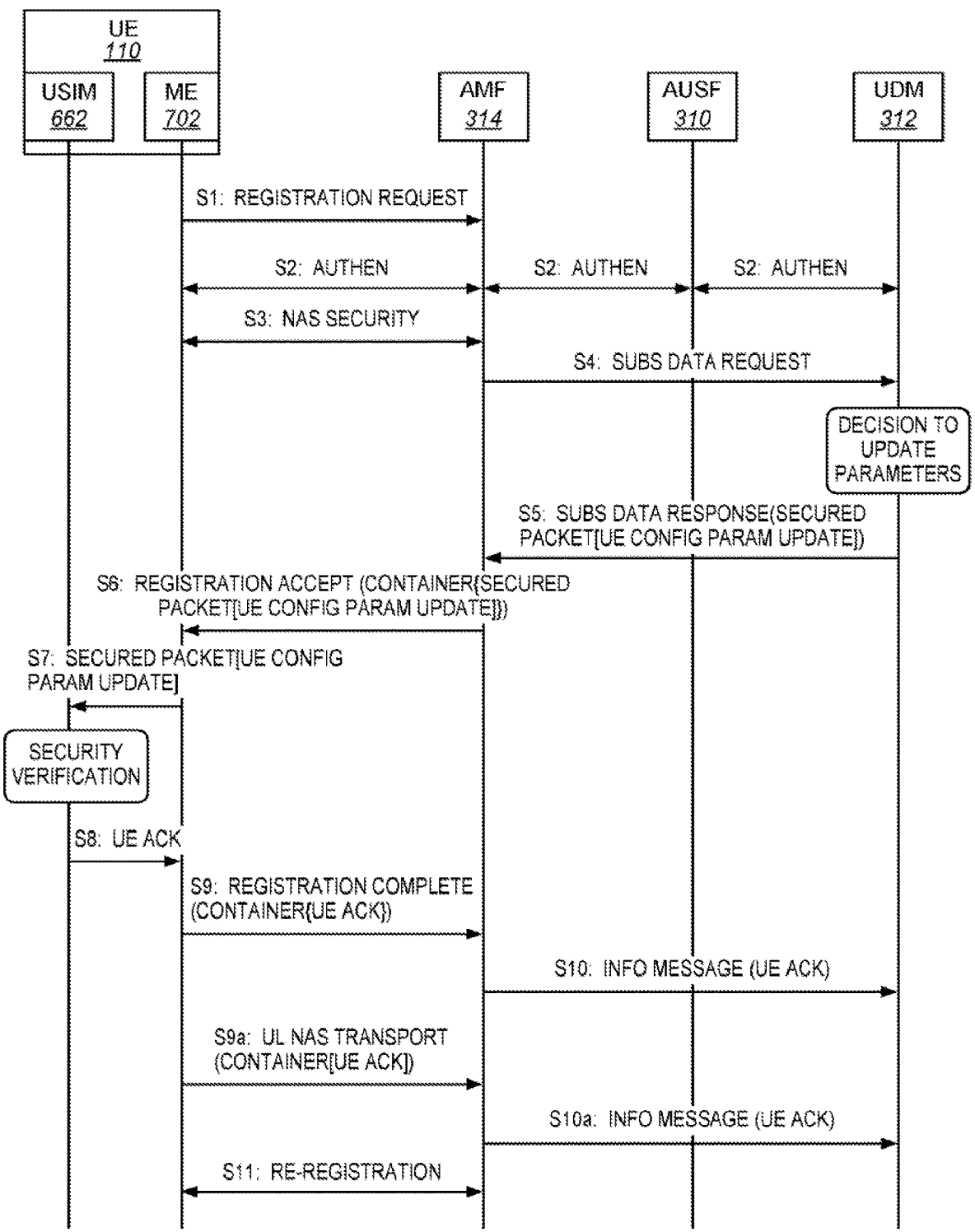
FIG. 13 is a message diagram illustrating an update procedure during registration in an illustrative embodiment.

FIG. 13 is a message diagram illustrating an update procedure during registration in an illustrative embodiment. In this embodiment, UE 110 is in idle mode (e.g., RRC_IDLE). UE 110 initiates a NAS registration procedure by sending a NAS registration request to AMF element 314 (S1). In response to the NAS registration request (of type "initial"), AMF element 314 may initiate an authentication procedure (S2) to authenticate UE 110. For the authentication procedure, AMF element 314 may interact with AUSF element 310 and UDM element 312. For example, AMF element 314 may send an authentication request (i.e., Nausf_UEAuthentication_Authenticate Request) to AUSF element 310. In response to receiving the authentication request, AUSF element 310 may send an authentication request (i.e., Nudm_UEAuthentication_Get Request) to UDM element 312. UDM element 312 hosts functions related to the Authentication Credential Repository and Processing Function (ARPF), which selects an authentication method and computes the authentication data and keying materials (e.g., tokens) for the AUSF element 310 (if needed). UDM element 312 may send an authentication response (i.e., Nudm_UEAuthentication_Get Response) to AUSF element 310, which includes the authentication vector (AV) and other information. AUSF element 310 may then send an authentication response (i.e., Nuasf_UEAuthentication_Authenticate Response) to AMF element 314, which includes the AV and other information. AMF element 314 is configured to perform an authentication procedure with UE 110 using information provided by UDM/AUSF. For example, AMF element 314 may send an authentication request to UE 110 along with an authentication token from the AV, and UE 110 attempts to validate the authentication token. If successful, UE 110 computes a response token, and sends an authentication response with the response token, which is received by AMF element 314. AMF element 314 may format or generate another authentication request (i.e., Nausf_UEAuthentication_Authenticate Request), and insert the response token from UE 110 in the authentication request, along with other information. AMF element 314 may then send the authentication request to AUSF element 310. AUSF element 310 may verify whether the response token from UE 110 matches an expected response token, and send an authentication response (i.e., Nausf_UEAuthentication_Authenticate Response) to AMF element 314 indicating success/failure of the authentication.

After authentication, AMF element 314 may initiate a NAS security procedure to establish a NAS security context (S3). As part of the NAS security procedure, AMF element 314 selects a NAS security algorithm (or multiple algorithms) for ciphering and integrity protection. AMF element 314 then sends a Security Mode Command message to UE 110 that indicates the NAS security algorithm(s), the ngKSI, and other information. UE 110 uses the ngKSI and NAS security algorithm to derive corresponding keys for protecting subsequent NAS messages. A NAS security context is therefore established between UE 110 and AMF element 314. UE 110 then sends a Security Mode Complete message to AMF element 314.

As a further part of the NAS registration procedure, AMF element 314 sends a subscription data request (e.g., Nudm_SDM_Get message) to UDM element 312 of the HPLMN to obtain the Access and Mobility Subscription data for UE 110, among other information (S4). When the user subscription information indicates to initiate a UE configuration parameter update (e.g., Routing ID update), UDM element 312 initiates an update procedure. UDM element 312 assembles a UE configuration parameter update, which includes one or more updated UE configuration parameters. UDM element 312 then applies security protection to the UE configuration parameter update by accessing a secured packet library to encapsulate the UE configuration parameter update in a secured packet. An example of secured packets and secured packet structure is disclosed in 3GPP TS 131.115 (v.9.0.0), which is incorporated by reference as is fully included herein. UDM element 312 then sends a subscription data response (e.g., Nudm_SDM_Get response) to AMF element 314 (S5), which includes the secured packet. UDM element 312 may also include a UE acknowledgement indicator and/or a re-registration indicator in the subscription data response.

As yet a further part of the registration procedure, AMF element 314 may also send a subscribe message (e.g., Nudm_SDM_Subscribe) to UDM element 312 to subscribe to notification of changes to UE configuration parameters (not shown in FIG. 13).

AMF element 314 is configured to transparently send the secured packet to UE 110 as part of the update procedure. Thus, AMF element 314 formats or generates a NAS registration accept message, and inserts the secured packet in a container of a NAS registration accept message. AMF element 314 may also insert the UE acknowledgement indicator and/or re-registration indicator (if applicable) in the container of the NAS registration accept message. AMF element 314 then sends the NAS registration accept message to UE 110 (S6).

In this embodiment, the container of the NAS registration accept message is designated for a UE configuration parameter update. Table 1 illustrates an example of the message content of a NAS registration accept message.

TABLE 1

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Registration accept message identity | Message type | M | V | 1 |
| ... | | | | | |
| xx | UE configuration parameter update container | UE configuration parameter update container | O | TLV-E | 20-2048 |
| ... | | | | | |

In this example, the NAS registration accept message includes a newly-defined UE configuration parameter update container Information Element (IE). A further description of NAS protocol may be found in 3GPP TS 24.301 (v15.4.0), which is incorporated by reference as if fully included herein. Table 2 is an example of a UE configuration parameter update container IE. This container is considered transparent as AMF element 314 inserts the secured packet in the container without modifying the secured packet.

TABLE 2

| 8 | 7 | 6 | 5 | 4 | 3 | 2 | 1 | |
|---|---|---|---|---|---|---|---|---|
| UE configuration parameter update container IEI | | | | | | | | octet 1 |
| Length of UE configuration parameter update container contents | | | | | | | | octet 2 octet 3 |
| UE configuration parameter update header | | | | | | | | octet 4 |
| Secured packet [UE configuration parameter update] | | | | | | | | octet 5-2048* |

Table 3 illustrates an example of a UE configuration parameter update header for the UE configuration parameter update container IE.

TABLE 3

| 8 | 7 | 6 | 5 | 4 | 3 | 2 | 1 | |
|---|---|---|---|---|---|---|---|---|
| 0 Spare | 0 Spare | 0 Spare | 0 Spare | 0 Spare | RRR | UE ACK | data type | octet 4 |

In the header, the RRR bit may be used as the re-registration indicator. The UE ACK bit may be used as the UE acknowledgement indicator. The data type bit may be used to indicate whether the container is being used in a NAS message being sent from the network to a UE (e.g., value=0), or in a NAS message being sent from the UE to the network (e.g., value=1).

Upon receiving the NAS registration accept message, ME 702 may behave as if an SMS message is received with protocol identifier set to "SIM data download", data coding scheme set to "class 2 message", and SMS payload as the secured packet. ME 702 routes or uploads the secured packet to USIM 662 (S7). USIM 662 performs a security check to verify that the secured packet was sent by UDM element 312 of the home network. If the security check is not successful, then USIM 662 discards the UE configuration parameter update and continues with the registration procedure. If the security check is successful, then USIM 662 unpacks the UE configuration parameter update from the secured packet using a secured packet library. After secured packet integrity/replay protection is validated, USIM 662 updates one or more of the UE configuration parameters 664 based on the UE configuration parameter update.

If the network requested an acknowledgement from UE 110 and the security check was successful, then USIM 662 may send a UE acknowledgement to ME 702 (S8). ME 702 formats or generates another NAS message to transport the UE acknowledgement to AMF element 314. In the example shown in FIG. 13, ME 702 formats a NAS registration complete message, and inserts the UE acknowledgement in a container of a NAS registration complete message. The container of the NAS registration complete message is designated for a UE acknowledgement. Table 4 illustrates an example of the message content of a NAS registration complete message.

TABLE 4

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Registration accept message identity | Message type | M | V | 1 |
| ... | | | | | |
| xx | UE acknowledgment container | UE acknowledgement container | O | TLV-E | 20-2048 |

In this example, the NAS registration complete message includes a newly-defined UE acknowledgement container IE. Table 5 is an example of a UE acknowledgement container IE.

TABLE 5

| 8 | 7 | 6 | 5 | 4 | 3 | 2 | 1 | |
|---|---|---|---|---|---|---|---|---|
| UE acknowledgement container IEI | | | | | | | | octet 1 |
| Length of UE acknowledgement container contents | | | | | | | | octet 2 octet 3 |
| UE acknowledgement header | | | | | | | | octet 4 |
| UE acknowledgement | | | | | | | | octet 5-20 |

Table 6 illustrates an example of a UE acknowledgement header.

TABLE 6

| 8 | 7 | 6 | 5 | 4 | 3 | 2 | 1 | |
|---|---|---|---|---|---|---|---|---|
| 0 Spare | 0 Spare | 0 Spare | 0 Spare | 0 Spare | 0 Spare | 0 Spare | data type | octet 4 |

In another example, USIM 662 may apply security protection to the UE acknowledgement by accessing a secured packet library to encapsulate the UE acknowledgement in a secured packet. ME 702 may therefore insert the secured packet in the UE acknowledgement container IE.

ME 702 then sends the NAS registration complete message to AMF element 314 with the container including the UE acknowledgement (S9). AMF element 314 sends an information message (e.g., Nudm_SDM_Info message) to UDM element 312 with the UE acknowledgement (S10).

UDM element 312 may then verify that the UE acknowledgement is provided by UE 110.

In an alternative shown in FIG. 13, ME 702 may use another type of NAS message to send the UE acknowledgement to AMF element 314. In this alternative, ME 702 formats a UL NAS Transport message, and inserts the UE acknowledgement in a container of the UL NAS Transport message. A payload container type value may be designated for the UE acknowledgment in the payload container IE of the UL NAS Transport message. ME 702 then sends the UL NAS Transport message to AMF element 314 with the container including the UE acknowledgement (S9a). AMF element 314 in turn sends an information message (e.g., Nudm_SDM_Info message) to UDM element 312 with the UE acknowledgement (S10a).

If the network indicated that re-registration is required for UE 110 and the security check was successful, then UE 110 de-registers and re-initiates a new NAS registration procedure (S11) using the updated UE configuration parameters.

Example 2: Update Procedure after Registration Using Secured Packet

Figure 14:
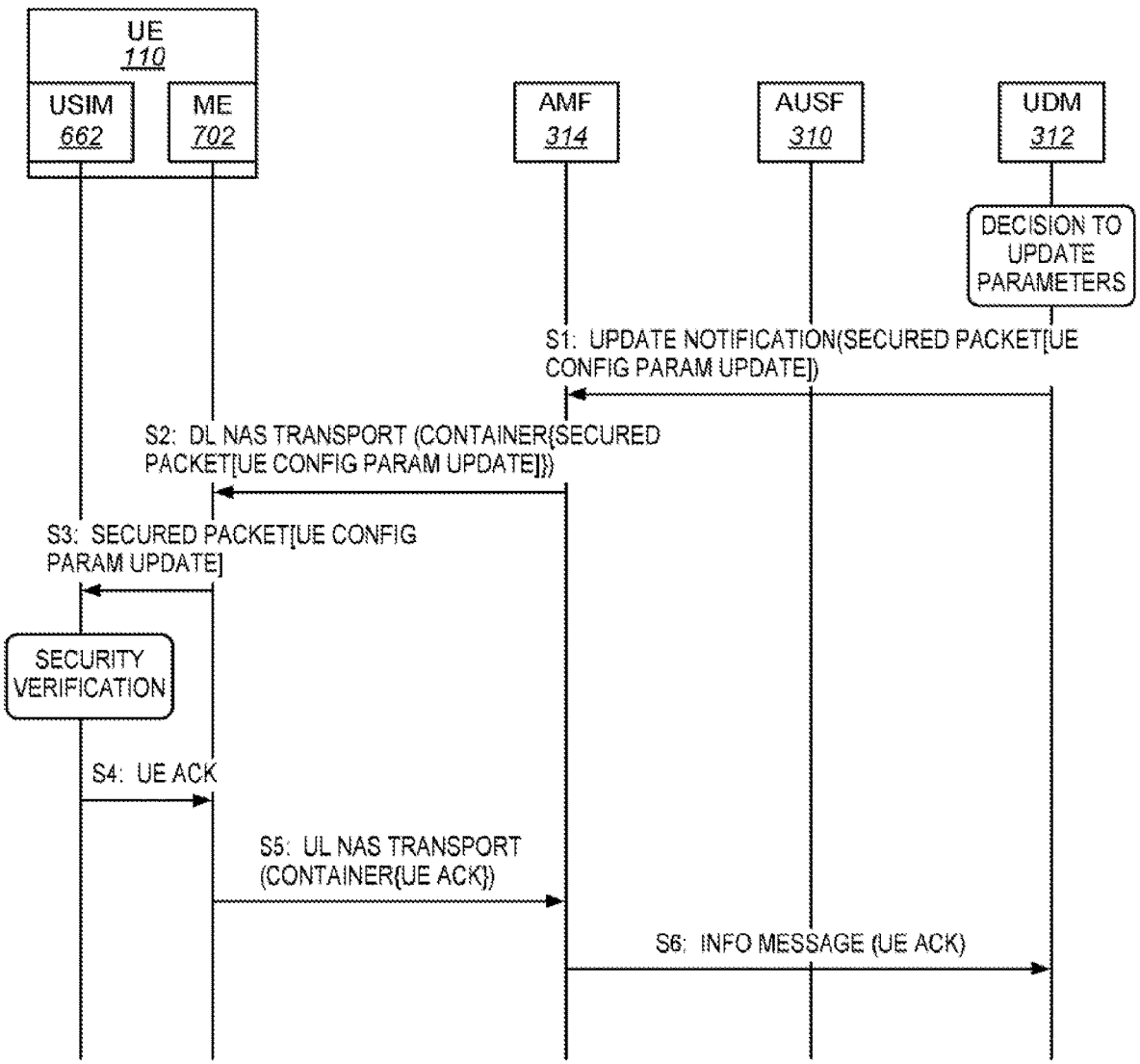
FIG. 14 is a message diagram illustrating an update procedure after registration in an illustrative embodiment.

FIG. 14 is a message diagram illustrating an update procedure after registration in an illustrative embodiment. In this embodiment, UE 110 has already registered with the network, and is in connected mode (i.e., RRC-CONNECTED). At some point after registration, UDM element 312 may receive an instruction or process local policies to determine that UE configuration parameters in UE 110 need to be updated. Thus, UDM element 312 initiates an update procedure, and assembles a UE configuration parameter update. UDM element 312 then applies security protection to the UE configuration parameter update by accessing a secured packet library to encapsulate the UE configuration parameter update in a secured packet. UDM element 312 then sends an update notification (e.g., Nudm_SDM_UpdateNotification) to AMF element 314 (S1), which includes the secured packet. UDM element 312 may also include a UE acknowledgement indicator and/or re-registration indicator in the update notification.

AMF element 314 is configured to transparently send the secured packet to UE 110 as part of the update procedure. Thus, AMF element 314 formats or generates a Downlink (DL) NAS Transport message, and inserts the secured packet in a container of a DL NAS Transport message. AMF element 314 may also insert the UE acknowledgement indicator and/or re-registration indicator (if applicable) in the container of the DL NAS Transport message. In this embodiment, the container of the DL NAS Transport message is designated for a UE configuration parameter update. AMF element 314 may set the Payload container type IE to "UE configuration parameter container" and set the Payload container IE to the secured packet. AMF element 314 then sends the DL NAS Transport message to UE 110 (S2).

Upon receiving the DL NAS Transport message, ME 702 may behave as if an SMS message is received with a protocol identifier set to "SIM data download", data coding scheme set to "class 2 message", and SMS payload as a secured packet. ME 702 routes or uploads the secured packet to USIM 662 (S3). USIM 662 performs a security check to verify that the secured packet was sent by UDM element 312 of the home network. If the security check is not successful, then USIM 662 discards the UE configuration parameter update. If the security check is successful, then USIM 662 unpacks the UE configuration parameter update from the secured packet using a secured packet library. After secured packet integrity/replay protection is validated, USIM 662 updates one or more of the UE configuration parameters 664 based on the UE configuration parameter update.

If the network requested an acknowledgement from UE 110 and the security check was successful, then USIM 662 may send a UE acknowledgement to ME 702 (S4). ME 702 formats or generates a UL NAS Transport message, and inserts the UE acknowledgement in a container of the UL NAS Transport message. The container of the UL NAS Transport message is designated for a UE acknowledgement. ME 702 then sends the UL NAS Transport message to AMF element 314 with the container including the UE acknowledgement (S5). AMF element 314 sends an information message (e.g., Nudm_SDM_Info message) to UDM element 312 with the UE acknowledgement (S6). UDM element 312 may then verify that the UE acknowledgement is provided by UE 110.

If the network indicated that re-registration is required for UE 110 and the security check was successful, then UE 110 de-registers and re-initiates a new NAS registration procedure using the updated UE configuration parameters (not shown).

Example 3: Update Procedure During Registration Using Security Key

Figure 15:
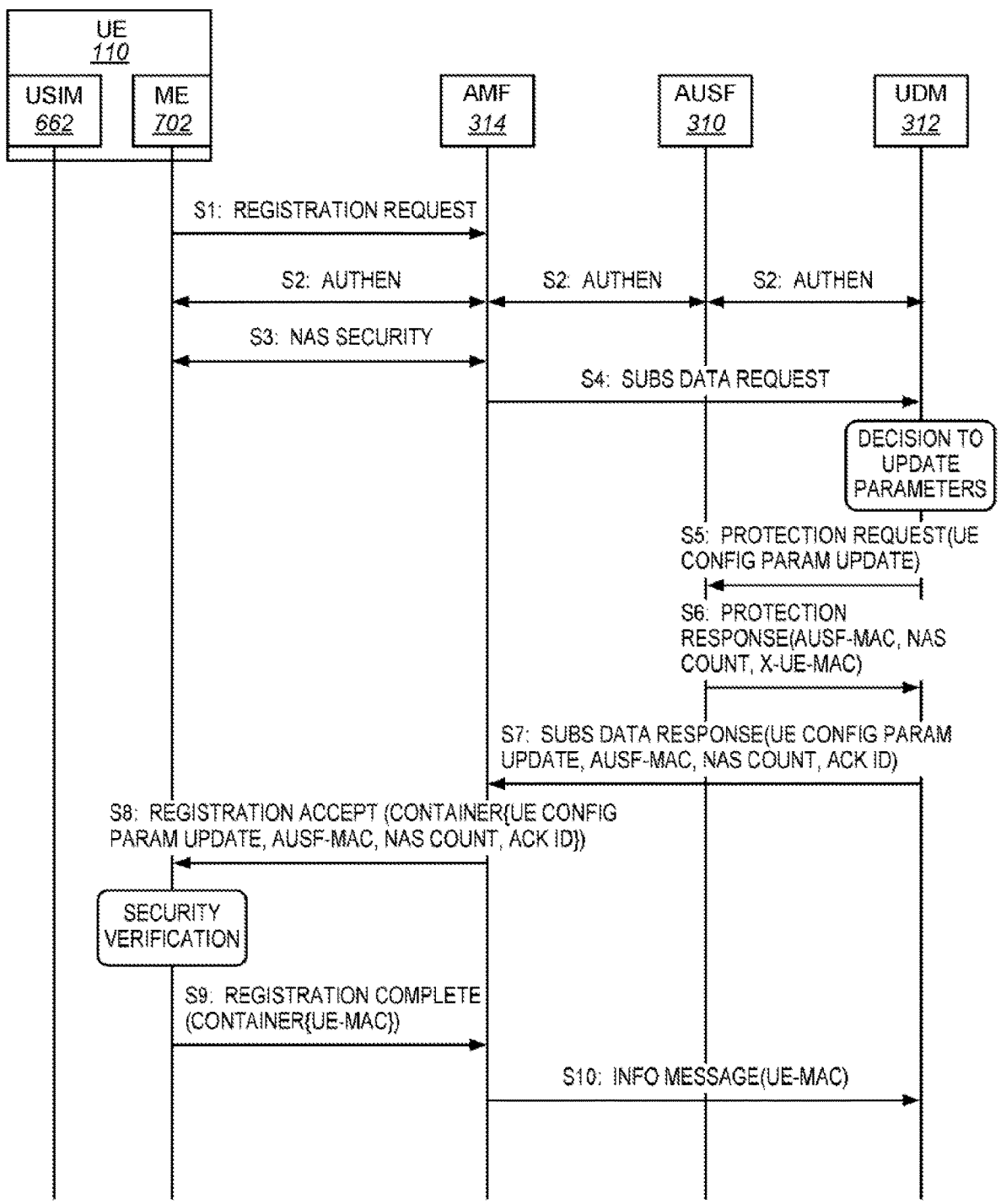
FIG. 15 is a message diagram illustrating an update procedure during registration in an illustrative embodiment.

FIG. 15 is a message diagram illustrating an update procedure during registration in an illustrative embodiment. In this embodiment, UE 110 initiates a NAS registration procedure by sending a NAS registration request to AMF element 314 (S1). In response to the NAS registration request (of type "initial"), AMF element 314 may initiate an authentication procedure (S2) to authenticate UE 110. When UE 110 is authenticated to the network, AMF element 314 may initiate a NAS security procedure to establish a NAS security context (S3). With UE 110 authenticated and the NAS security context established, AMF element 314 sends a subscription data request (e.g., Nudm_SDM_Get message) to UDM element 312 of the HPLMN to obtain the Access and Mobility Subscription data for UE 110, among other information (S4). When the user subscription information indicates to initiate a UE configuration parameter update (e.g., Routing ID update), UDM element 312 initiates an update procedure. UDM element 312 assembles a UE configuration parameter update, and employs integrity protection on the UE configuration parameter update using a NAS security context for UE 110. To do so, UDM element 312 sends a protection request (e.g., Nausf_ParameterProtectionRequest) to AUSF element 310 with the UE configuration parameter update (S5). AUSF element 310 identifies the NAS count (constructed from a NAS sequence number), and calculates integrity protection information based on the NAS security context for UE 110, such as an AUSF Message Authentication Code (MAC) for the UE configuration parameter update and the NAS count. AUSF element 310 may also calculate an expected MAC from UE 110 (X-UE-MAC). AUSF element 310 then sends a protection response (e.g., Nausf_ParameterProtectionResponse) with the integrity protection information (i.e., AUSF-MAC, NAS count, and X-UE-MAC) to UDM element 312 (S6). UDM element 312 then sends a subscription data response (e.g., Nudm_SDM_Get response) to AMF element 314 (S7), which includes the UE configuration parameter update and the integrity protection information (i.e., AUSF-MAC and NAS count). UDM element 312 may also include a UE acknowledgement indicator and/or re-registration indicator in the subscription data response.

AMF element 314 is configured to transparently send the UE configuration parameter update to UE 110 as part of the update procedure. Thus, AMF element 314 formats or generates a NAS registration accept message, and inserts the UE configuration parameter update in a container of a NAS registration accept message along with the integrity protection information (e.g., AUSF-MAC and NAS count). AMF element 314 may also insert the UE acknowledgement indicator and/or re-registration indicator (if applicable) in the container of the NAS registration accept message. AMF element 314 then sends the NAS registration accept message to UE 110 (S8).

In this example, the NAS registration accept message includes a newly-defined UE configuration parameter update container IE. Table 7 is an example of a UE configuration parameter update container IE.

TABLE 7

| 8 | 7 | 6 | 5 | 4 | 3 | 2 | 1 | |
|---|---|---|---|---|---|---|---|---|
| UE configuration parameter update container IEI | | | | | | | | octet 1 |
| Length of UE configuration parameter update container contents | | | | | | | | octet 2 |
| UE configuration parameter update header | | | | | | | | octet 3 |
| | | | | | | | | octet 4 |
| AUSF-MAC | | | | | | | | octet 5-20 |
| NAS count | | | | | | | | octet 21-22 |
| UE configuration parameter update | | | | | | | | octet 23*-2048* |

This container is considered transparent as AMF element 314 inserts the UE configuration parameter update in the container without modifying the UE configuration parameter update. As described in Example 1, the UE ACK bit of the UE configuration parameter update header may be used to indicate that the network requested an acknowledgement from the UE, and the RRR bit may be used to indicate that the network request re-registration.

In response to receiving the NAS registration accept message, ME 702 of UE 110 performs a security check to verify that the UE configuration parameter update was sent by UDM element 312 of the home network. For example, ME 702 calculates a UE-MAC for the UE configuration parameter update and the NAS count, and compares the UE-MAC with the AUSF-MAC. If the MACs match, then the UE configuration parameter update is verified to be from the home network, and the security check is successful. If the security check is not successful, then ME 702 discards the UE configuration parameter update and continues with the registration procedure. If the security check is successful, then ME 702 and/or USIM 662 updates one or more of the UE configuration parameters 664 based on the UE configuration parameter update.

If the network requested an acknowledgement from UE 110 and the security check was successful, then ME 702 formats a NAS registration complete message, and inserts the UE-MAC in a container of a NAS registration complete message. The container of the NAS registration complete message is designated for a UE acknowledgement. In this example, the NAS registration complete message includes a newly-defined UE acknowledgement container IE. Table 8 is an example of a UE acknowledgement container IE.

TABLE 8

| 8 | 7 | 6 | 5 | 4 | 3 | 2 | 1 | |
|---|---|---|---|---|---|---|---|---|
| UE configuration parameter update container IEI | | | | | | | | octet 1 |
| Length of UE configuration parameter update | | | | | | | | octet 2 |
| container contents | | | | | | | | octet 3 |
| UE configuration parameter update header | | | | | | | | octet 4 |
| UE-MAC | | | | | | | | octet 5-20 |

ME 702 then sends the NAS registration complete message to AMF element 314 with the container including the UE-MAC (S9). AMF element 314 sends an information message (e.g., Nudm_SDM_Info message) to UDM element 312 with the UE-MAC (S10). UDM element 312 may then compare the UE-MAC calculated by UE 110 with the X-UE-MAC calculated by AUSF element 310 to verify that the UE acknowledgement is provided by UE 110.

If the network indicated that re-registration is required for UE 110 and the security check was successful, then UE 110 de-registers and re-initiates a new NAS registration procedure using the updated UE configuration parameters (not shown).

Example 4: Update Procedure after Registration Using Security Key

Figure 16:
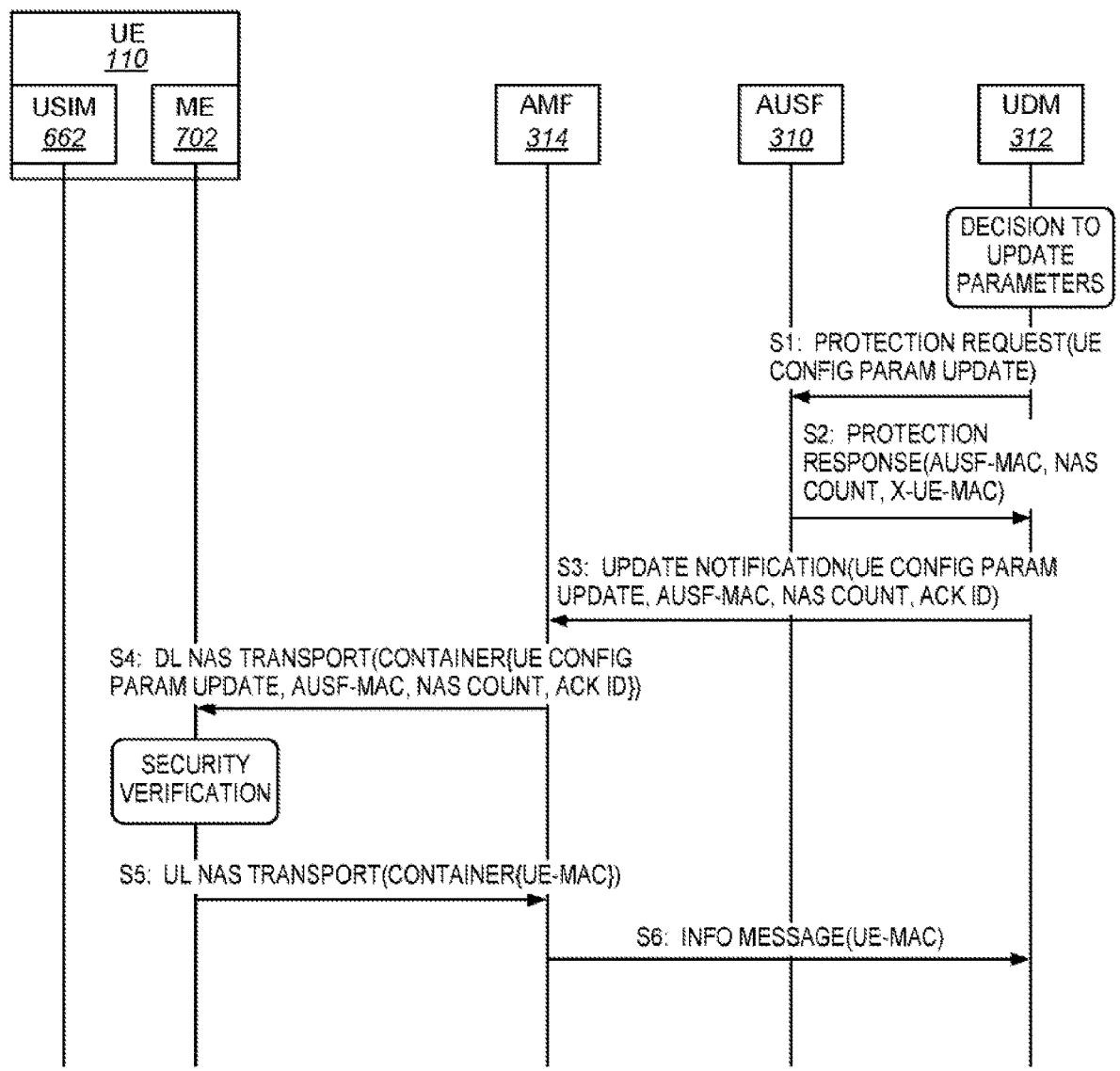
FIG. 16 is a message diagram illustrating an update procedure after registration in an illustrative embodiment.

FIG. 16 is a message diagram illustrating an update procedure after registration in an illustrative embodiment. In this embodiment, UE 110 has already registered with the network, and is in connected mode. At some point after registration, UDM element 312 may receive an instruction or process local policies to determine that UE configuration parameters in UE 110 need to be updated. Thus, UDM element 312 initiates an update procedure, and assembles a UE configuration parameter update. UDM element 312 also employs integrity protection on the UE configuration parameter update using a NAS security context for UE 110. To do so, UDM element 312 sends a protection request (e.g., Nausf_ParameterProtectionRequest) to AUSF element 310 with the UE configuration parameter update (S1). AUSF element 310 identifies the NAS count, and calculates integrity protection information based on the NAS security context for UE 110, such as the AUSF-MAC for the UE configuration parameter update and the NAS count. AUSF element 310 may also calculate an expected MAC from UE 110 (X-UE-MAC). AUSF element 310 then sends a protection response (e.g., Nausf_ParameterProtectionResponse) with the integrity protection information (i.e., AUSF-MAC, NAS count, and X-UE-MAC) to UDM element 312 (S2). UDM element 312 then sends an update notification (e.g., Nudm_SDM_UpdateNotification) to AMF element 314 (S3), which includes the UE configuration parameter update and the integrity protection information (i.e., AUSF-MAC and NAS count). UDM element 312 may also include a UE acknowledgement indicator and/or re-registration indicator in the update notification.

AMF element 314 is configured to transparently send the UE configuration parameter update to UE 110 as part of the update procedure. Thus, AMF element 314 formats or generates a DL NAS Transport message, and inserts the UE configuration parameter update in a container of a DL NAS Transport message along with the integrity information (e.g., AUSF-MAC and NAS count). AMF element 314 may also insert the UE acknowledgement indicator and/or re-registration indicator (if applicable) in the container of the DL NAS Transport message. In this embodiment, the container of the DL NAS Transport message is designated for a UE configuration parameter update. AMF element 314 then sends the DL NAS Transport message to UE 110 (S4).

In response to receiving the DL NAS Transport message, ME 702 of UE 110 performs a security check to verify that the UE configuration parameter update was sent by UDM element 312 of the home network. If the security check is not successful, then ME 702 discards the UE configuration parameter update. If the security check is successful, then ME 702 and/or USIM 662 updates one or more of the UE configuration parameters 664 based on the UE configuration parameter update.

If the network requested an acknowledgement from UE 110 and the security check was successful, then ME 702 formats a UL NAS Transport message, and inserts the UE-MAC in a container of a UL NAS Transport message. The container of the UL NAS transport message is designated for a UE acknowledgement. ME 702 then sends the UL NAS Transport message to AMF element 314 with the container including the UE-MAC (S5). AMF element 314 sends an information message (e.g., Nudm_SDM_Info message) to UDM element 312 with the UE-MAC (S6). UDM element 312 may then compare the UE-MAC calculated by UE 110 with the X-UE-MAC calculated by AUSF element 310 to verify that the UE acknowledgement is provided by UE 110.

If the network indicated that re-registration is required for UE 110 and the security check was successful, then UE 110 de-registers and re-initiates a new NAS registration procedure using the updated UE configuration parameters (not shown).

Figure 17:
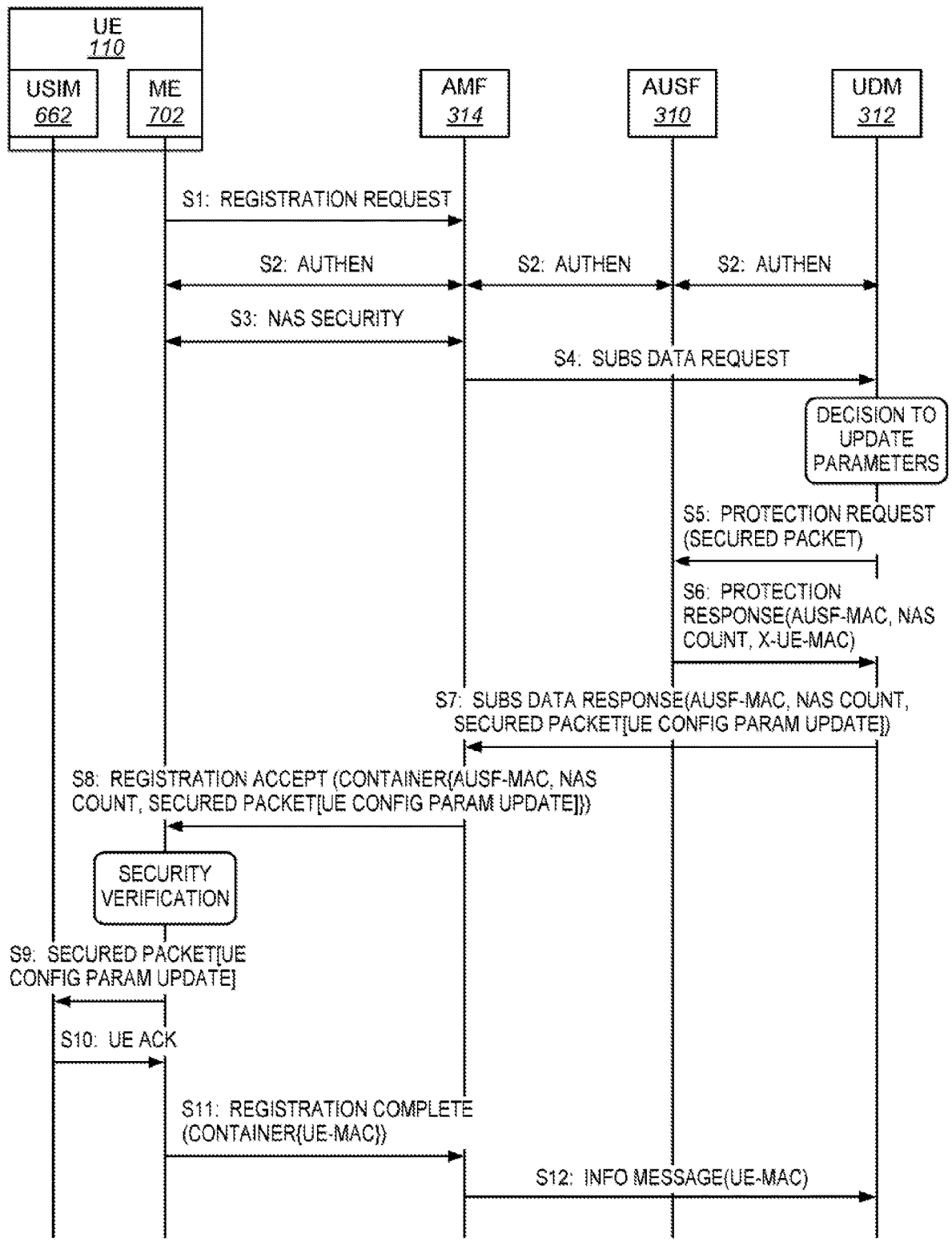
FIG. 17 is a message diagram illustrating an update procedure during registration in an illustrative embodiment.

Example 5: Update Procedure During Registration Using Secured Packet and Security Key FIG. 17 is a message diagram illustrating an update procedure during registration in an illustrative embodiment. In this embodiment, UE 110 initiates a NAS registration procedure by sending a NAS registration request to AMF element 314 (S1). In response to the NAS registration request (of type "initial"), AMF element 314 may initiate an authentication procedure (S2) to authenticate UE 110. After authentication of UE 110, AMF element 314 may initiate a NAS security procedure to establish a NAS security context (S3). With UE 110 authenticated and the NAS security context established, AMF element 314 sends a subscription data request (e.g., Nudm_SDM_Get message) to UDM element 312 of the HPLMN to obtain the Access and Mobility Subscription data for UE 110, among other information (S4). When the user subscription information indicates to initiate a UE configuration parameter update (e.g., Routing ID update), UDM element 312 initiates an update procedure. UDM element 312 assembles a UE configuration parameter update, which includes one or more updated UE configuration parameters. UDM element 312 then applies security protection to the UE configuration parameter update by accessing a secured packet library to encapsulate the UE configuration parameter update in a secured packet.

UDM element 312 also employs integrity protection on the secured packet using a NAS security context for UE 110. To do so, UDM element 312 sends a protection request (e.g., Nausf_ParameterProtectionRequest) to AUSF element 310 with the secured packet (S5). AUSF element 310 identifies the NAS count, and calculates integrity protection information based on the NAS security context for UE 110, such as an AUSF-MAC for the secured packet and the NAS count. AUSF element 310 may also calculate an expected MAC from UE 110 (X-UE-MAC). AUSF element 310 then sends a protection response (e.g., Nausf_ParameterProtectionResponse) with the integrity protection information (i.e., AUSF-MAC, NAS count, and X-UE-MAC) to UDM element 312 (S6). UDM element 312 then sends a subscription data response (e.g., Nudm_SDM_Get response) to AMF element 314 (S7), which includes the secured packet and the integrity protection information (i.e., AUSF-MAC and NAS count). UDM element 312 may also include a UE acknowledgement indicator and/or re-registration request in the subscription data response.

AMF element 314 is configured to transparently send the secured packet to UE 110 as part of the update procedure. Thus, AMF element 314 formats or generates a NAS registration accept message, and inserts the secured packet in a container of a NAS registration accept message. AMF element 314 may also insert the UE acknowledgement indicator and/or re-registration request (if applicable) in the container of the NAS registration accept message, along with the AUSF-MAC and NAS count. In this example, the NAS registration accept message includes a newly-defined UE configuration parameter update container IE. Table 9 is an example of a UE configuration parameter update container IE.

TABLE 9

| 8 | 7 | 6 | 5 | 4 | 3 | 2 | 1 | |
|---|---|---|---|---|---|---|---|---|
| UE configuration parameter update container IEI | | | | | | | | octet 1 |
| Length of UE configuration parameter update container contents | | | | | | | | octet 2 octet 3 |
| UE configuration parameter update header | | | | | | | | octet 4 |
| AUSF-MAC | | | | | | | | octet 5-20 |
| NAS count | | | | | | | | octet 21-22 |
| Secured packet [UE configuration parameter update] | | | | | | | | octet 23*-2048* |

This container is considered transparent as AMF element 314 inserts the secured packet in the container without modifying the secured packet. AMF element 314 then sends the NAS registration accept message to UE 110 (S8). In response to receiving the NAS registration accept message, ME 702 of UE 110 performs a security check to verify that the secured packet was sent by UDM element 312 of the home network. If the security check is not successful, then ME 702 discards the secured packet and continues with the registration procedure. If the security check is successful, then ME 702 routes or uploads the secured packet to USIM 662 (S9). USIM 662 also performs a security check to verify that the secured packet was sent by UDM element 312 of the home network. If the security check is not successful, then USIM 662 discards the UE configuration parameter update. If the security check is successful, then USIM 662 unpacks the UE configuration parameter update from the secured packet using a secured packet library. USIM 662 then updates one or more of the UE configuration parameters 664 based on the UE configuration parameter update.

If the network requested an acknowledgement from UE 110 and the security check was successful, then ME 702 formats a NAS registration complete message and inserts the UE-MAC in a container of a NAS registration complete message. ME 702 then sends the NAS registration complete message to AMF element 314 (S 11). AMF element 314 sends an information message (e.g., Nudm_SDM_Info message) to UDM element 312 with the UE-MAC (S10). UDM element 312 may then compare the UE-MAC calculated by UE 110 with the X-UE-MAC calculated by AUSF element 310 to verify that the UE acknowledgement is provided by UE 110.

If the network indicated that re-registration is required for UE 110 and the security check was successful, then UE 110 de-registers and re-initiates a new NAS registration procedure using the updated UE configuration parameters (not shown).

Figure 18:
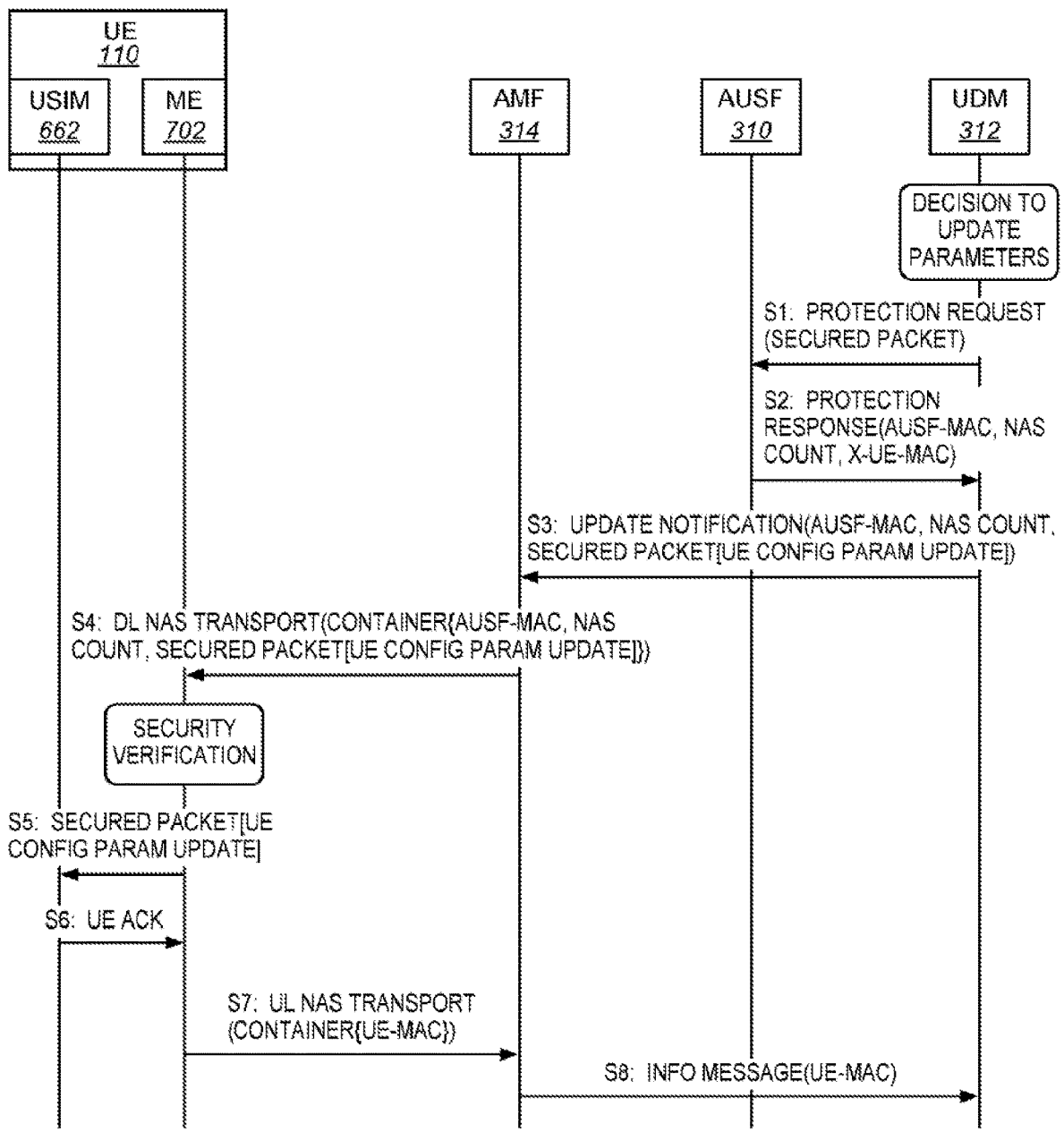
FIG. 18 is a message diagram illustrating an update procedure after registration in an illustrative embodiment.

Example 6: Update Procedure after Registration Using Secured Packet and Security Key FIG. 18 is a message diagram illustrating an update procedure after registration in an illustrative embodiment. In this embodiment, UE 110 has already registered with the network, and is in connected mode. At some point after registration, UDM element 312 may receive an instruction or process local policies to determine that UE configuration parameters in UE 110 need to be updated. Thus, UDM element 312 initiates an update procedure, and assembles a UE configuration parameter update. UDM element 312 then applies security protection to the UE configuration parameter update by accessing a secured packet library to encapsulate the UE configuration parameter update in a secured packet.

UDM element 312 also employs integrity protection on the secured packet using a NAS security context for UE 110. To do so, UDM element 312 sends a protection request (e.g., Nausf_ParameterProtectionRequest) to AUSF element 310 with the secured packet (S1). AUSF element 310 identifies the NAS count, and calculates integrity protection information based on the NAS security context for UE 110, such as an AUSF-MAC for the secured packet and the NAS count. AUSF element 310 may also calculate an expected MAC from UE 110 (X-UE-MAC). AUSF element 310 then sends a protection response (e.g., Nausf_ParameterProtectionResponse) with the integrity protection information (i.e., AUSF-MAC, NAS count, and X-UE-MAC) to UDM element 312 (S2). UDM element 312 then sends an update notification (e.g., Nudm_SDM_UpdateNotification) to AMF element 314 (S3), which includes the secured packet and the integrity protection information (i.e., AUSF-MAC and NAS count). UDM element 312 may also include a UE acknowledgement indicator and/or re-registration request in the update notification.

AMF element 314 is configured to transparently send the secured packet to UE 110 as part of the update procedure. Thus, AMF element 314 formats or generates a DL NAS Transport message, and inserts the secured packet in a container of DL NAS Transport message. AMF element 314 may also insert the UE acknowledgement indicator and/or re-registration indicator (if applicable) in the container of the DL NAS Transport message, along with the AUSF-MAC and NAS count. AMF element 314 then sends the DL NAS Transport message to UE 110 (S4).

In response to receiving the DL NAS Transport message, ME 702 of UE 110 performs a security check to verify that the secured packet was sent by UDM element 312 of the home network. If the security check is not successful, then ME 702 discards the secured packet. If the security check is successful, then ME 702 routes or uploads the secured packet to USIM 662 (S5). USIM 662 also performs a security check to verify that the secured packet was sent by UDM element 312 of the home network. If the security check is not successful, then USIM 662 discards the UE configuration parameter update. If the security check is successful, then USIM 662 unpacks the UE configuration parameter update from the secured packet using a secured packet library. USIM 662 then updates one or more of the UE configuration parameters 664 based on the UE configuration parameter update. USIM 662 also sends a UE acknowledgement to ME 702 (S6).

If the network requested an acknowledgement from UE 110 and the security check was successful, then ME 702 formats a UL NAS Transport message and inserts the UE-MAC in a container of the UL NAS Transport message. ME 702 then sends the UL NAS Transport message to AMF element 314 (S7). AMF element 314 sends an information message (e.g., Nudm_SDM_Info message) to UDM element 312 with the UE-MAC (S8). UDM element 312 may then compare the UE-MAC calculated by UE 110 with the X-UE-MAC calculated by AUSF element 310 to verify that the UE acknowledgement is provided by UE 110.

If the network indicated that re-registration is required for UE 110 and the security check was successful, then UE 110 de-registers and re-initiates a new NAS registration procedure using the updated UE configuration parameters (not shown).

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:
   (a) hardware-only circuit implementations (such as implementations in only analog and/or digital circuitry);
   (b) combinations of hardware circuits and software, such as (as applicable):
   (i) a combination of analog and/or digital hardware circuit(s) with software/firmware; and
   (ii) any portions of hardware processor(s) with software (including digital signal processor(s)), software, and memory(ies) that work together to cause an apparatus, such as a mobile phone or server, to perform various functions); and
   (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. A User Equipment (UE) comprising:
a Universal Subscriber Identity Module (USIM) storing UE configuration parameters for the UE;
at least one processor; and
at least one memory storing instructions thereon that, when executed by the at least one processor, cause the UE to perform at least:
receiving, from an Access and Mobility Management Function (AMF) element, a Non-Access Stratum (NAS) message comprising a container that includes a UE configuration parameter update for the UE, the UE configuration parameter update being encapsulated in a secured packet in the container of the NAS message;
performing, using a mobile equipment (ME) of the UE, a first security check to verify the UE configuration parameter update;
if the first security check is successful, forwarding, using the ME, the secured packet to the USIM;
performing, using the USIM, a second security check to verify the secured packet; and
if the second security check is successful, updating, using the USIM, one or more of the UE configuration parameters stored in the USIM based on the UE configuration parameter update encapsulated in the secured packet.

2. The UE of claim 1, wherein the UE configuration parameter update provided in the secured packet comprises a routing indicator parameter.

3. The UE of claim 1, wherein the ME performs the first security check by verifying the integrity of the UE configuration parameter update in the secured packet using a NAS security context associated with the UE.

4. The UE of claim 1, wherein the USIM resides on a Universal Integrated Circuit Board (UICC) within the UE.

5. The UE of claim 1, wherein the NAS message comprises a NAS registration accept message received by the UE during a NAS registration procedure.

6. The UE of claim 5, wherein the instructions stored on the at least one memory, when executed by the at least one processor, further cause the UE to perform at least:
in an instance in which the NAS registration accept message includes a UE acknowledgement indicator, sending a second NAS message towards the AMF element, the second NAS message comprising a container including a UE acknowledgement from the UE that indicates the UE configuration parameter update was received by the UE, wherein the second NAS message further comprises a NAS registration complete message or an Uplink NAS Transport message.

7. The UE of claim 1, wherein the NAS message comprises a Downlink NAS Transport message of a NAS transport procedure.

8. The UE of claim 7, wherein the instructions stored on the at least one memory, when executed by the at least one processor, further cause the UE to perform at least:
in an instance in which the Downlink NAS Transport message includes a UE acknowledgement indicator, sending an Uplink NAS Transport message towards the AMF element, the Uplink NAS Transport message comprising a container including a UE acknowledgement from the UE indicating that the UE configuration parameter update was received by the UE.

9. The UE of claim 1, wherein the instructions stored on the at least one memory, when executed by the at least one processor, further cause the UE to perform at least:
in an instance in which the NAS message includes a re-registration indicator, initiating a NAS registration procedure to re-register the UE with the communication network using the updated UE configuration parameters.

10. A User Equipment (UE) comprising:
a Universal Subscriber Identity Module (USIM) storing UE configuration parameters for the UE;
at least one processor; and
at least one memory storing instructions thereon that, when executed by the at least one processor, cause the UE to perform at least:
receiving, from an Access and Mobility Management Function (AMF) element in a communication network, a Non-Access Stratum (NAS) message comprising a container, a secured packet being encapsulated in the container of the NAS message, a UE configuration parameter update for the UE being provided in the secured packet encapsulated in the container of the NAS message;
performing, using a mobile equipment (ME) of the UE, a first security check to verify the secured packet encapsulated in the container of the NAS message;
if the first security check is successful, extracting, using the ME, the secured packet from the container of the NAS message and forwarding, using the ME, the secured packet to the USIM;
performing, using the USIM, a second security check to verify an integrity of the UE configuration parameter update provided in the secured packet; and
if the second security check is successful, updating, using the USIM, one or more of the UE configuration parameters stored in the USIM based on the UE configuration parameter update provided in the secured packet.

11. The UE of claim 10, wherein the UE configuration parameter update provided in the secured packet comprises a routing indicator parameter.

12. The UE of claim 10, wherein the ME performs the first security check by verifying the integrity of the UE configuration parameter update in the secured packet using a NAS security context associated with the UE.

13. The UE of claim 10, wherein the USIM resides on a Universal Integrated Circuit Board (UICC) within the UE.

14. The UE of claim 10, wherein the NAS message comprises a NAS registration accept message received by the UE during a NAS registration procedure.

15. The UE of claim 14, wherein the instructions stored on the at least one memory, when executed by the at least one processor, further cause the UE to perform at least:

in an instance in which the NAS registration accept message includes a UE acknowledgement indicator, sending a second NAS message towards the AMF element, the second NAS message comprising a container including a UE acknowledgement from the UE that indicates the UE configuration parameter update was received by the UE, wherein the second NAS message further comprises a NAS registration complete message or an Uplink NAS Transport message.

16. The UE of claim 10, wherein the NAS message comprises a Downlink NAS Transport message of a NAS transport procedure.

17. The UE of claim 16, wherein the instructions stored on the at least one memory, when executed by the at least one processor, further cause the UE to perform at least:
in an instance in which the Downlink NAS Transport message includes a UE acknowledgement indicator, sending an Uplink NAS Transport message towards the AMF element, the Uplink NAS Transport message comprising a container including a UE acknowledgement from the UE indicating that the UE configuration parameter update was received by the UE.

18. The UE of claim 10, wherein the instructions stored on the at least one memory, when executed by the at least one processor, further cause the UE to perform at least:
in an instance in which the NAS message includes a re-registration indicator, initiating a NAS registration procedure to re-register the UE with the communication network using the updated UE configuration parameters.

19. A User Equipment (UE) comprising:
a Universal Subscriber Identity Module (USIM) storing initial UE configuration parameters for the UE;
at least one processor; and
at least one memory storing instructions that, when executed by the at least one processor, cause the UE to perform at least:
receiving, from an Access and Mobility Management Function (AMF) element, during a Non-Access Stratum (NAS) transport procedure, a Downlink NAS Transport message having a container that includes a UE configuration parameter update for the UE, wherein the UE configuration parameter update is encapsulated in a secured packet within the container of the Downlink NAS Transport message, the UE configuration parameter update encapsulated in the secured packet of the Downlink NAS Transport message comprising a routing indicator parameter;
performing, by a mobile equipment (ME) domain of the UE, a first security check to verify the secured packet within the container of the Downlink NAS Transport message;
in an instance in which the first security check is successful, forwarding the secured packet from the ME domain to the USIM;
upon receiving, at the USIM, from the ME domain, the secured packet encapsulating the UE configuration parameter update, performing, at the USIM, a second security check to verify the secured packet;
in an instance in which the USIM determines the second security check is successful by verifying the secured packet, updating, at the USIM, one or more of the initial UE configuration parameters stored in the USIM based on the UE configuration parameter update encapsulated in the secured packet received within the container of the Downlink NAS Transport message; and in an instance in which the USIM determines the second security check is unsuccessful, refraining from updating, at the USIM, one or more of the initial UE configuration parameters stored in the USIM based on the UE configuration parameter update encapsulated in the secured packet received within the container of the Downlink NAS Transport message.

20. The UE of claim 19, wherein the USIM resides on a Universal Integrated Circuit Board (UICC) within the UE.

21. The UE of claim 19, wherein the instructions stored on the at least one memory, when executed by the at least one processor, further cause the UE to perform at least:
in an instance in which the Downlink NAS Transport message includes a UE acknowledgement indicator, sending an Uplink NAS Transport message to the AMF element, the Uplink NAS Transport message comprising a container including a UE acknowledgement from the UE indicating that the UE configuration parameter update was received by the UE.

22. The UE of claim 19, wherein the instructions, when executed by the at least one processor, are further configured to cause the UE to perform:
in an instance in which the Downlink NAS Transport message includes a re-registration indicator, initiating a NAS registration procedure to re-register the UE using the updated UE configuration parameters updated as the USIM of the UE.

23. A method comprising:
receiving, at a user equipment (UE), from an Access and Mobility Management Function (AMF) element, a Non-Access Stratum (NAS) message having a container that includes a UE configuration parameter update for the UE, the UE configuration parameter update being encapsulated in a secured packet;
performing, by a mobile equipment (ME) of the UE, a first security check to verify the UE configuration parameter update; and
in an instance in which the first security check is successful, forwarding, by the ME, the secured packet to a Universal Subscriber Identify Module (USIM) of the UE in operable communication with the ME,
wherein the USIM is operable to perform a second security check to verify the secured packet, and, in an instance in which the second security check is successful, to update one or more of the UE configuration parameters in the USIM based on the UE configuration parameter update encapsulated in the secured packet.

24. The method of claim 23, wherein one or more of:
(i) the UE configuration parameter update includes a routing indicator,
(ii) the first security check verifies the integrity of the UE configuration parameter update using a NAS security context of the UE,
(iii) the USIM resides on a Universal Integrated Circuit Card (UICC), within the UE, or
(iv) the NAS message comprises a NAS registration accept message sent to the UE during a NAS registration procedure, or
(v) in an instance in which the NAS registration accept message includes a UE acknowledgement indicator, the method further comprises causing the UE to send a second NAS message to the AMF element with a container including a UE acknowledgement from the UE that the UE configuration parameter update was received, wherein the second NAS message comprises a NAS registration complete message or an Uplink NAS Transport message.

25. The method of claim 23, wherein one or more of:
(i) the NAS message comprises a Downlink NAS Transport message of a NAS transport procedure, or
(ii) in an instance in which the Downlink NAS Transport message includes a UE acknowledgement indicator, the method further comprises causing the UE to send an Uplink NAS Transport message to the AMF element with a container including a UE acknowledgement from the UE that the UE configuration parameter update was received.

26. The method of claim 23, wherein, in an instance in which the NAS message includes a re-registration indicator, the method further comprises:
causing the UE to initiate a NAS registration procedure to re-register using the updated UE configuration parameters.

27. An Access and Mobility Management Function (AMF) element, the AMF element comprising:
at least one processor; and
at least one memory storing instructions thereon that, when executed by the at least one processor, cause the AMF element to perform at least:
generating a Non-Access Stratum (NAS) message having a container that includes a user equipment (UE) configuration parameter update for a UE, the UE configuration parameter update being encapsulated in a secured packet; and
transmitting the NAS message towards the UE, wherein the NAS message is operable to:
(i) cause a mobile equipment (ME) of the UE to perform a first security check to verify the UE configuration parameter update,
(ii) in an instance in which the first security check is successful, cause the ME to forward the secured packet to a Universal Subscriber Identify Module (USIM) of the UE in operable communication with the UE,
(iii) cause the USIM to perform a second security check to verify the secured packet, and
(iv) in an instance in which the second security check is successful, cause the USIM to update one or more of the UE configuration parameters in the USIM based on the UE configuration parameter update encapsulated in the secured packet.

28. The AMF element of claim 27, wherein one or more of:
(i) the UE configuration parameter updated includes a routing indicator,
(ii) the first security check is operable to verify the integrity of the UE configuration parameter update using a NAS security context of the UE,
(iii) the NAS message comprises a NAS registration accept message sent to the UE during a NAS registration procedure, or
(iv) in an instance in which the NAS registration accept message includes a UE acknowledgement indicator, the NAS registration accept message is further operable to cause the UE to send a second NAS message to the AMF element with a container including a UE acknowledgement from the UE that the UE configuration parameter update was received, wherein the second NAS message comprises a NAS registration complete message or an Uplink NAS Transport message.

29. The AMF element of claim 27, wherein one or more of:
(i) the NAS message comprises a Downlink NAS Transport message of a NAS transport procedure, or
(ii) in an instance in which the Downlink NAS Transport message includes a UE acknowledgement indicator, the NAS message is further operable to cause the UE to send an Uplink NAS Transport message to the AMF element with a container including a UE acknowledgement from the UE that the UE configuration parameter update was received.

30. The AMF element of claim 27, wherein one or more of:
(i) in an instance in which the NAS message includes a re-registration indicator, the NAS message is further operable to cause the UE to initiate a NAS registration procedure to re-register using the updated UE configuration parameters, or
(ii) the instructions stored in the least one memory, when executed by the at least one processor, further cause the AMF element to further perform:
receiving a control plane message from a Unified Data Management (UDM) element including the UE configuration parameter update for the UE; and
inserting the UE configuration parameter update into the container of the NAS message.

31. The AMF element of claim 27, wherein the instructions stored in the least one memory, when executed by the at least one processor, further cause the AMF to perform:
receiving the second NAS message from the UE during the NAS registration procedure with a container including a UE acknowledgement that the UE configuration parameter update was received; and
sending another control plane message to the UDM element with the UE acknowledgement, wherein the second NAS message received from the UE comprises a NAS registration complete message or an Uplink NAS Transport message.

32. A method comprising:
generating a Non-Access Stratum (NAS) message having a container that includes a user equipment (UE) configuration parameter update for a UE, the UE configuration parameter update being encapsulated in a secured packet; and
transmitting the NAS message towards the UE, wherein the NAS message is operable to
(i) cause a mobile equipment (ME) of the UE to perform a first security check to verify the UE configuration parameter update,
(ii) in an instance in which the first security check is successful, cause the ME to forward the secured packet to a Universal Subscriber Identify Module (USIM) in operable communication with the UE,
(iii) cause the USIM to perform a second security check to verify the secured packet, and
(iv) in an instance in which the second security check is successful, cause the USIM to update one or more of the UE configuration parameters in the USIM based on the UE configuration parameter update encapsulated in the secured packet.

33. The method of claim 32, wherein one or more of:
(i) the UE configuration parameter update includes a routing indicator,
(ii) the first security check verifies the integrity of the UE configuration parameter update using a NAS security context of the UE, (iii) the NAS message comprises a NAS registration accept message sent to the UE during a NAS registration procedure, or
(iv) in an instance in which the NAS registration accept message includes a UE acknowledgement indicator, the method further comprises causing the UE to send a second NAS message to an Access and Mobility Management Function (AMF) element with a container including a UE acknowledgement form the UE that the UE configuration parameter update was received, wherein the second NAS message comprises a NAS registration complete message or an Uplink NAS Transport message.

34. The method of claim 32, wherein at least one of:
(i) the NAS message comprises a Downlink NAS Transport message of a NAS transport procedure, or
(ii) in an instance in which the Downlink NAS Transport message includes a UE acknowledgement indicator, the method further comprises causing the UE to send an Uplink NAS Transport message to the AMF element with a container including a UE acknowledgement from the UE that the UE configuration parameter update was received.

35. The method of claim 32, wherein, in an instance in which the NAS message includes a re-registration indicator, the method further comprises:
   causing the UE to initiate a NAS registration procedure to re-register using the updated UE configuration parameters.

36. The method of claim 32, further comprising:
   receiving a control plane message from a Unified Data Management (UDM) element including the UE configuration parameter update for the UE; and
   inserting the UE configuration parameter update into the container of the NAS message.

37. The method of claim 32, further comprising:
   receiving the second NAS message from the UE during the NAS registration procedure with a container including a UE acknowledgement that the UE configuration parameter update was received; and
   sending another control plane message to the UDM element with the UE acknowledgement, wherein the second NAS message received from the UE comprises a NAS registration complete message or an Uplink NAS Transport message.

\* \* \* \* \*